United States Patent
Ida et al.

(10) Patent No.: US 9,626,767 B2
(45) Date of Patent: Apr. 18, 2017

(54) SURFACE NORMAL INFORMATION PRODUCING APPARATUS, IMAGE CAPTURING APPARATUS, SURFACE NORMAL INFORMATION PRODUCING METHOD, AND STORAGE MEDIUM STORING SURFACE NORMAL INFORMATION PRODUCING PROGRAM

(71) Applicant: CANON KABUSHIKI KAISHA, Tokyo (JP)

(72) Inventors: Yoshiaki Ida, Utsunomiya (JP); Chiaki Inoue, Utsunomiya (JP); Yuichi Kusumi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/001,289

(22) Filed: Jan. 20, 2016

(65) Prior Publication Data
US 2016/0210754 A1     Jul. 21, 2016

(30) Foreign Application Priority Data
Jan. 20, 2015 (JP) .................................. 2015-008230

(51) Int. Cl.
*G06K 9/00* (2006.01)
*G06T 7/00* (2017.01)

(52) U.S. Cl.
CPC .. *G06T 7/0073* (2013.01); *G06T 2207/10021* (2013.01)

(58) Field of Classification Search
None
See application file for complete search history.

(56) References Cited

U.S. PATENT DOCUMENTS 5,028,138 A * 7/1991 Wolff ..................... G01B 11/24
356/364
7,136,217 B2 * 11/2006 Kawakami ............. B82Y 20/00
359/321

(Continued)

FOREIGN PATENT DOCUMENTS

JP     2007086720 A    4/2007
JP     4435865 B2      3/2010

(Continued)

OTHER PUBLICATIONS

Matsushita, "Photometric Stereo", Information Processing Society of Japan, IPSJ SIG Technical Report, pp. 1-12, May 20, 2011, vol. 2011-CVIM-177, No. 29. English abstract provided. Cited in Specification.

*Primary Examiner* — Andrae S Allison
(74) *Attorney, Agent, or Firm* — Rossi, Kimms & McDowell LLP

(57) ABSTRACT

The surface normal information producing apparatus acquires, as captured images of an object, multiple first images in which light source positions relative to the object are mutually different and three or more second images in which polarization states are mutually different, and performs area division of a surface of the object depending on at least one of luminance information that changes corresponding to the light source positions acquired from the first images and polarization information acquired from the second images. The apparatus selects, for each divided area obtained by the area division, information to be used in production of surface normal information from information relating to change of the luminance information corresponding to the light source positions and the polarization information to produce the surface normal information.

22 Claims, 12 Drawing Sheets

(56) References Cited

U.S. PATENT DOCUMENTS

| | | | | |
|---|---|---|---|---|
| 7,760,256 B2* | 7/2010 | Kanamori | ............... | H04N 9/045 |
| | | | | 348/222.1 |
| 7,792,367 B2* | 9/2010 | Kanamori | ............ | G02B 5/3025 |
| | | | | 356/369 |
| 7,948,514 B2* | 5/2011 | Sato | ....................... | G03B 35/26 |
| | | | | 348/46 |
| 7,948,622 B2* | 5/2011 | Kanamori | ............ | G02B 5/3025 |
| | | | | 356/364 |
| 8,184,194 B2 | 5/2012 | Sato et al. | | |
| 2009/0279807 A1* | 11/2009 | Kanamorl | ............ | G02B 5/3025 |
| | | | | 382/274 |
| 2009/0304299 A1* | 12/2009 | Motomura | ............ | G06T 3/4007 |
| | | | | 382/254 |
| 2010/0283883 A1* | 11/2010 | Sato | ..................... | G02B 27/283 |
| | | | | 348/335 |
| 2015/0346083 A1* | 12/2015 | Matsumoto | ........ | G01N 21/8851 |
| | | | | 356/369 |

FOREIGN PATENT DOCUMENTS

| JP | 44435867 B2 | 3/2010 |
|---|---|---|
| JP | 2010122158 A | 6/2010 |

* cited by examiner

SURFACE NORMAL INFORMATION PRODUCING APPARATUS, IMAGE CAPTURING APPARATUS, SURFACE NORMAL INFORMATION PRODUCING METHOD, AND STORAGE MEDIUM STORING SURFACE NORMAL INFORMATION PRODUCING PROGRAM

BACKGROUND OF THE INVENTION

Field of the Invention

The present invention relates to a technique of producing surface normal information of a surface of an object.

Description of the Related Art

When acquiring an image by image capturing of an object through an image capturing apparatus such as a digital camera, a known method acquires not only luminance information, but also information of a shape of the object, in particular, information of a surface normal. Acquisition of a large amount of physical information relating to the object allows image production to be performed based on a physical model in image processing after the image capturing. For example, the image processing can produce an image in which an impression of the object is changed. The impression of the object is determined by factors such as shape information of the object, reflectance information thereof and light source information of a light source illuminating the object; as the shape information, it is effective to use surface normal information, not a three-dimensional shape. This is because physical behavior of light emitting from a light source and then being reflected by the object depends on a local surface normal.

A known method of acquiring the surface normal information acquires distance information by distance acquisition methods such as a triangulation method using laser light and a binocular stereo method and converts a three-dimensional shape calculated from the distance information into the surface normal information. However, these distance acquisition methods require a complicated apparatus, and an accuracy of the surface normal information thus obtained is insufficient. Moreover, methods using laser light such as the above distance acquisition methods cannot be applied to an object with luster and a transparent object.

Known methods of directly acquiring surface normal information include a photometric stereo method and a method of estimating the surface normal information from polarization information. The photometric stereo method (refer to Yasuyuki Matsushita, "Photometric Stereo", Information processing society of Japan Research Report, Vol. 2011-CVIM-177, No. 29, pp. 1-12, 2011) assumes a reflection characteristic based on a surface normal of an object and a light source direction, and determines the surface normal from luminance information of the object acquired at multiple light source positions and the assumed reflection characteristic. The reflection characteristic of the object is often expressed by using a Lambert's reflection model according to a Lambert's cosine law.

In general, a reflected light from an object includes a specularly reflected light (also referred to as "a specularly reflected component") and a diffusely reflected light (also referred to as "a diffusely reflected component"). The specularly reflected light is a light regularly reflected at an object surface and is a light Fresnel-reflected at the object surface (interface) according to Fresnel's equation. The diffusely reflected light is a light scattered back from inside the object after having transmitted through the object surface. The specularly reflected component cannot be expressed by the Lambert's cosine law, and the surface normal cannot be accurately calculated by the photometric stereo method when the specularly reflected component is included in the reflected light from the object observed by the image capturing apparatus.

Furthermore, shaded and shadow portions where any light from a light source does not reach generates a deviation from an assumed reflection model, and thereby the surface normal information of the object cannot be accurately acquired. Moreover, the diffusely reflected component from an object having a rough surface also deviates from the Lambert's cosine law. For example, Japanese Patent Laid-open No. 2010-122158 discloses a method of calculating a true surface normal from multiple surface normal candidates obtained by using four or more light sources. Japanese Patent No. 4435865 discloses a method of extracting a diffuse reflection area on a basis of a polarization state of a polarized light at an object surface when a polarization state of a light emitted from a light source or a position of the light source is changed and of applying the photometric stereo method to the extracted diffuse reflection area.

A known method of performing the estimation from the polarization information uses a polarization degree and a polarization direction as the polarization information. Japanese Patent No. 4435867 discloses a method of acquiring surface normal information of an object from multiple polarization images having different viewpoints. The method disclosed in Japanese Patent No. 4435867 estimates the surface normal information of the object by estimating one degree of freedom of a surface normal from the polarization direction for each viewpoint. The method acquires the surface normal information in an occlusion area where the information can be obtained only from one viewpoint, under a constraint condition that the area is an edge portion of the object.

However, the method disclosed in Japanese Patent Laid-open No. 2010-122158 cannot acquire the surface normal information of a specular object generating a small diffusely reflected component. When the object has shaded and shadow portions where any light from any light source does not reach and any diffusely reflected light under three or more light source conditions cannot be observed, the method acquires wrong surface normal information. However, constant acquisition of the diffusely reflected components under the three or more light sources for a common object requires image capturing with a larger number of light source conditions, which is difficult. Moreover, the method cannot estimate a correct surface normal when the diffusely reflected light does not obey the Lambert's cosine law.

In addition, the method disclosed in Japanese Patent No. 4435865 applies the photometric stereo method only in the diffuse reflection area, so that the method cannot acquire the surface normal information in a specular reflection area. The method also cannot estimate a correct surface normal when the diffusely reflected light does not obey the Lambert's cosine law.

Moreover, the method disclosed in Japanese Patent No. 4435867 cannot calculate the surface normal information in an area with a small polarization degree. Image capturing from a viewpoint where a large polarization degree is obtained requires a complicated image capturing apparatus for a common object, which is not desirable.

SUMMARY OF THE INVENTION

The present invention provides a surface normal information producing apparatus, a surface normal information producing method and others, which are capable of robustly acquiring surface normal information of a common object.

The present invention provides as an aspect thereof a surface normal information producing apparatus configured to produce surface normal information on a normal line to a surface of an object by using a captured image acquired by image capturing of the object. The apparatus includes an image acquirer configured to acquire, as the captured images, multiple first images in which light source positions relative to the object are mutually different and three or more second images in which polarization states are mutually different, a divider configured to perform area division of the surface of the object depending on at least one of luminance information that changes corresponding to the light source positions acquired from the first images and polarization information acquired from the second images, and a producer configured to select, for each divided area obtained by the area division, information to be used in production of the surface normal information from information relating to change of the luminance information corresponding to the light source positions and the polarization information to perform the production of the surface normal information.

The present invention provides as another aspect thereof an image capturing apparatus including the above surface normal information producing apparatus.

The present invention provides as another aspect thereof a surface normal information producing method to produce surface normal information on a normal line to a surface of an object by using a captured image obtained by image capturing of the object. The method includes acquiring, as the captured images, multiple first images in which light source positions relative to the object are mutually different and three or more second images in which polarization states are mutually different, performing area division of the surface of the object depending on at least one of luminance information that changes corresponding to the light source positions acquired from the first images and polarization information acquired from the second images, and selecting, for each divided area obtained by the area division, information to be used in production of the surface normal information from information relating to change of the luminance information corresponding to the light source positions and the polarization information to perform the production of the surface normal information.

The present invention provides as another aspect thereof a non-transitory computer-readable storage medium storing a computer program configured to cause a computer to perform an image process according to the above method.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Matters shared by the following embodiments will be described before specific description of the embodiments.

First, description will be made of "polarization information". In general, a polarization state of light can be expressed by four parameters such as Stokes parameters. Information representing the polarization state of light, like these Stokes parameters, is referred to as "polarization information" in the embodiments. The polarization information also includes amounts depending on the polarization state, such as a polarization degree, a polarization direction and a measurement error of the polarization information, which are described later.

Basically, the polarization information is acquired by measuring four independent polarization components. However, a circular polarization component is unlikely to be obtained in nature, and a linear polarization component is often sufficient as the polarization information of an object. This means that non polarization and circular polarization are acquired indistinguishably. In this case, intensities and luminances of at least three different linear polarization components may be acquired.

A light transmitted through a polarizer becomes a linearly polarized light polarized in a polarization transmission axis direction, and thus the intensities and luminances of the lights transmitted through the polarizer may be measured under three or more conditions with different polarization transmission axis angles.

Figure 12:
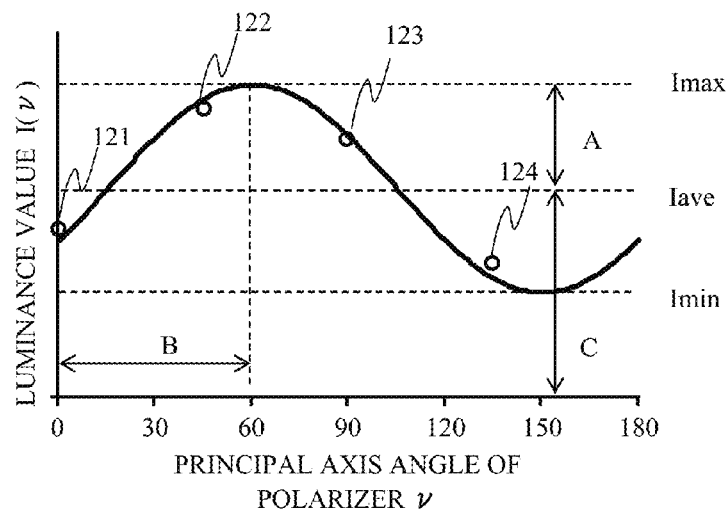
FIG. 12 illustrates a method of acquiring polarization information.

FIG. 12 illustrates a method of acquiring the polarization information. In FIG. 12, reference numerals 121 to 124 denote luminances of lights (polarized lights) respectively transmitted through four polarizers with the polarization principal axes of 0, 45, 90, and 135 degrees; the luminances have values along a sinusoidal curve. This relation is expressed by following Expression (1) where I represents a luminance of a reflected light, and v represents a transmission axis angle of the polarizer.

$$I(v) = A \cdot \cos 2(v-B) + C \tag{1}$$

The polarization information can be acquired by setting constants A, B and C in Expression (1). The constants A, B and C are positive values, and B takes a value between 0° and 180° according to a periodicity of a cosine function.

When the luminances for the three transmission axis angles of the polarizer are measured, unknown constants are also three of A, B and C, and thus the constants A, B and C can be uniquely calculated.

On the other hand, when the luminances are measured for four or more polarization conditions, the constants (parameters) A, B and C are calculated by fitting. The fitting may be performed by using, as an evaluation function, a difference between a measured value (vi, Ii) obtained under an i-th condition and a theoretical value obtained by Expression (1), and can be performed by a known method such as a least-square method.

When the luminance is acquired by image capturing using an image capturing unit (an image-capturing optical system and an image sensor) of an image capturing apparatus, an output signal obtained through the image capturing unit is desirably corrected so that a luminance value of an actual light and the output signal have a linear relation.

Various kinds of polarization information are obtained from the parameters A, B and C calculated by the above method.

Amplitude A of the luminance for the transmission axis

Average luminance value Iave for the principal polarization axis $$Iave = C \tag{2}$$

Maximum luminance Value Imax of the polarized light $$Imax = A + C \tag{3}$$

Minimum luminance Imin of the polarized light (a non-polarized component of the luminance)

$$Imin = C - A \tag{4}$$

Polarization direction ψ (a phase angle of the polarizer at which the luminance of the polarized light becomes maximum)

$$\psi = B \tag{5}$$

Polarization degree ρ

$$\rho = (Imax - Imin)/(Imax + Imin) = A/C \tag{6}$$

Polarization estimation error Ep $$Ep = \sum_{i} (I_{m,i} - A \cdot \cos 2(v-B) - C)^2 \tag{7}$$

In Expression (7), Im, i represents the luminance in the i-th polarization state.

Next, description will be made of a method of acquiring the surface normal information of the object from the polarization information. A unit surface normal vector of the object has two degrees of freedom. A conditional expression that these two degrees of freedom should satisfy can be obtained from the above-described polarization information.

Figure 13:
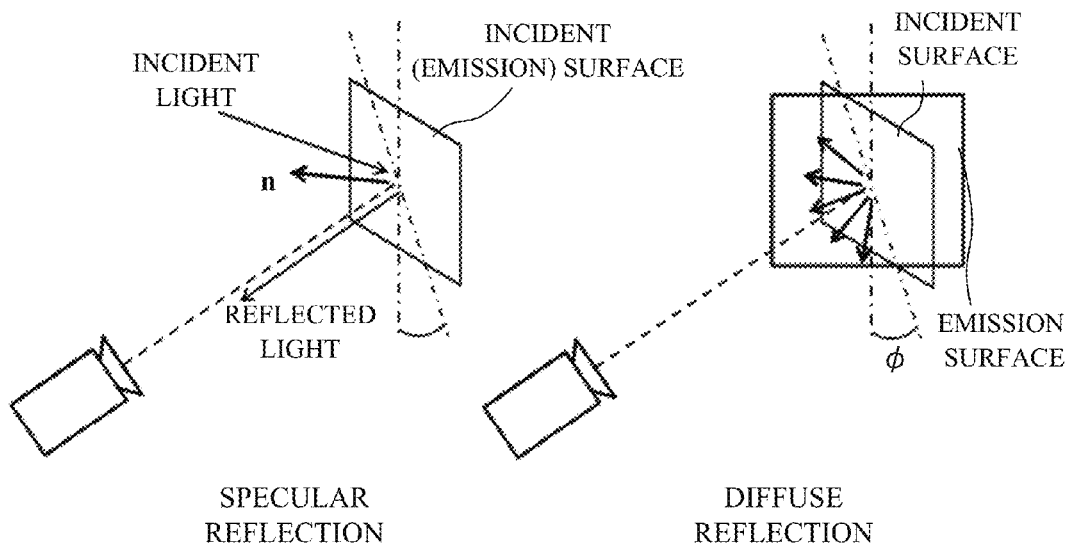
FIG. 13 illustrates a relation between a polarization direction and an incident surface.

As illustrated in FIG. 13, angle information of an incident surface or an emission surface is obtained from the polarization direction. A reflected light from the object is polarized mainly because of different Fresnel reflectances between an S-polarized light and a P-polarized light. A specularly reflected light has a large reflectance for the S-polarized light, so that the polarization direction is orthogonal to the incident surface. In specular reflection, the incident surface and the emission surface are identical to each other.

On the other hand, a diffusely reflected light scattered inside the object and exiting therefrom has a large transmittance for the P-polarized light, and the polarization direction is within the emission surface. In other words, in a plane orthogonal to a viewing direction vector of the image capturing apparatus, a direction angle φ of a surface normal satisfies conditions expressed by following expressions (8):

$$\phi = \psi + \pi/2 \text{ (specularly reflected component)}$$

$$\phi = \psi \text{ (diffusely reflected component)} \tag{8}$$

where φ has an indefiniteness of 180 degrees.

Figure 14:
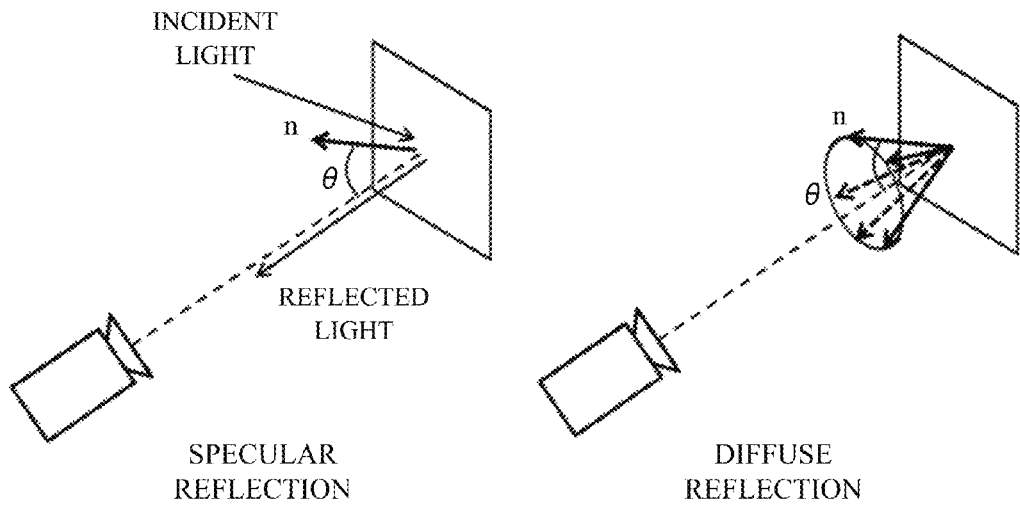
FIG. 14 illustrates a relation between a polarization degree and an angle formed between a viewing direction and a surface normal.
Figure 15A:
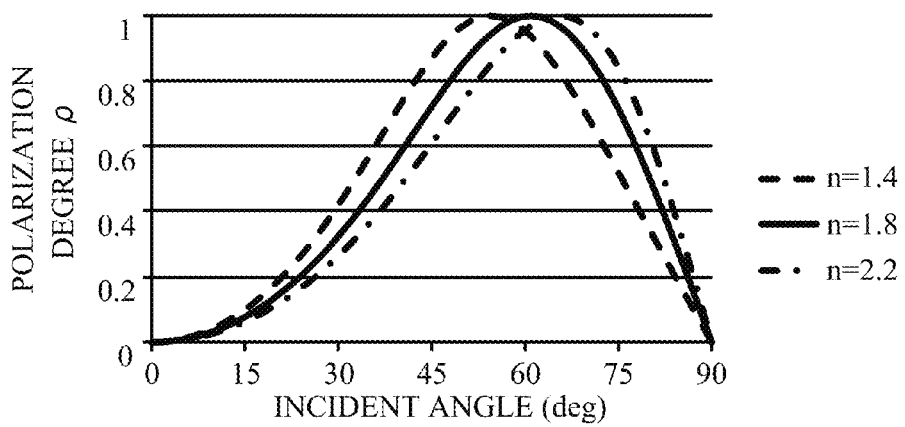
FIG. 15A illustrates a polarization degree of a secularly-reflected component.
Figure 15B:
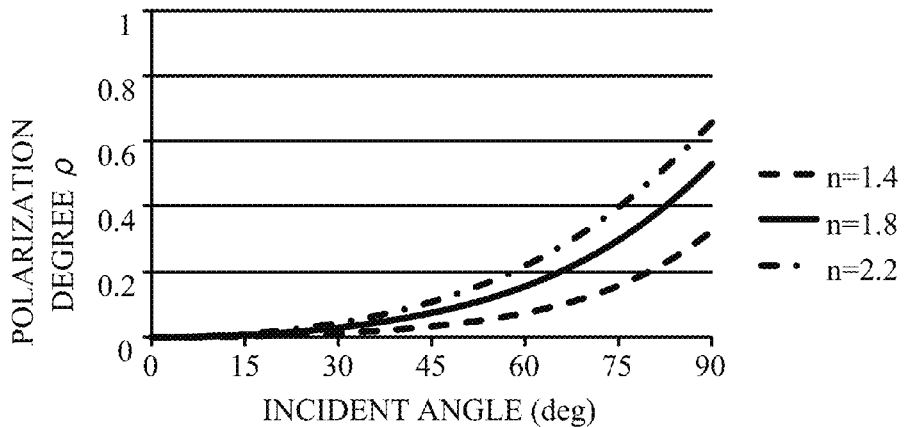
FIG. 15B illustrates a polarization degree of a diffusely reflected component.

As illustrated in FIG. 14, an angle formed by the surface normal with the viewing direction vector of the image capturing apparatus is obtained from the polarization degree. FIG. 15A illustrates an incident angle dependence of the polarization degree of the specularly reflected component, and FIG. 15B illustrates a reflection angle dependence of the polarization degree of the diffusely reflected component. For the specularly reflected component, an incident angle is equal to an angle formed by the surface normal of the object with the viewing direction vector of the image capturing apparatus, and, however, two incident angles can be obtained for one polarization degree. In other words, two solution candidates are obtained. The diffusely reflected component has a one-to-one relation between its polarization degree and its reflection angle. The angle formed by the surface normal of the object with the viewing direction vector of the image capturing apparatus is the reflection angle, which is obtained from the polarization degree.

In this manner, a condition to be satisfied by the surface normal of the object can be obtained from the polarization information. Combining multiple such conditions allows the surface normal to be estimated. For example, as disclosed in Japanese Patent No. 4435867, the surface normal of the object can be estimated by using the polarization direction viewed from multiple mutually different viewpoints. The surface normal is obtained as an intersection line of the incident surfaces obtained for two or more viewpoints. Since in reality a measurement error exists, the surface normal may be selected so as to have an average direction of surface normals calculated with different combinations of conditions of the viewpoint used to estimate the surface normal. When the incident surfaces viewed from different viewpoints are mutually identical, the surface normal cannot be uniquely selected. Such a case requires another polarization direction corresponding to other viewpoints.

Alternatively, the surface normal can be estimated from a combination of the polarization direction viewed from a single viewpoint and the polarization degree. For example, when the diffusely reflected component is observed, a direction angle of the surface normal is obtained from the polarization direction, and one zenith angle of the surface normal is obtained from the polarization degree. Since the direction angle has an indefiniteness between $\phi$ and $\phi+180°$, two solutions are obtained for the surface normal. When the observed reflected light is the specularly reflected component, two zenith angles of the surface normal are obtained from the polarization degree. In this case, four solution candidates for the surface normal are obtained because of the indefiniteness of the direction angle. When the reflected light is not definitely observed to be the diffusely reflected component and the specularly reflected component or a mixture thereof, an indefiniteness of 90° occurs in a relation between the polarization direction and the incident surface, which results in a further increased number of solution candidates. As described above, when multiple solution candidates are obtained, a method described later may be used to select a solution.

On the other hand, the surface normal may be estimated by using existing specular reflection separation methods. Examples of these methods include methods disclosed in Japanese Patent No. 4435865 and Japanese Patent No. 4435867, and techniques disclosed in "L. B. Wolff, Constraining Object Features Using a Polarization Reflectance Model, IEEE Trans. Patt. Anal. Mach. Intell., Vol. 13, No. 7, pp. 635-657 (1991)", and "G. J. Klinker, The Measurement of Highlights in Color Images, IJCV, Vol. 2, No. 1, pp. 7-32 (1988)". Using such a method can reduce the number of solution candidates for the surface normal vector, thereby enabling acquisition of the surface normal information with a higher accuracy.

Figure 16:
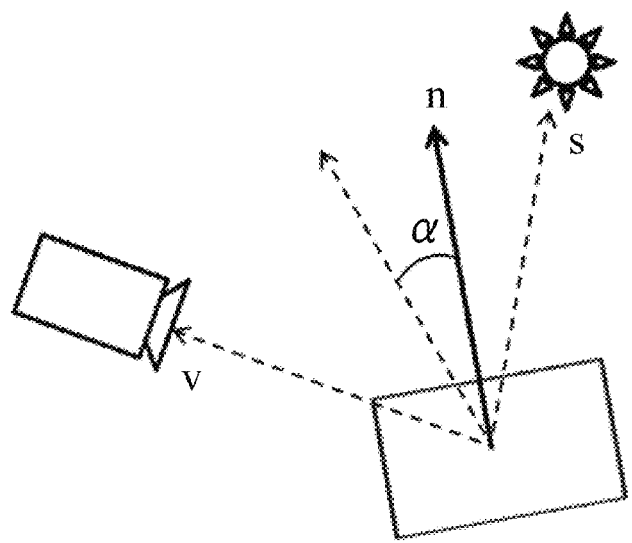
FIG. 16 illustrates a simplified "Torrance-Sparrow model".

A photometric stereo method may be used as a method of acquiring the surface normal of the object line information from change of the luminance information depending on light source positions. The photometric stereo method assumes a reflection characteristic based on the surface normal of the object and a light source direction and provides the surface normal from the luminance information of the object at multiple light source positions and the assumed reflection characteristic. The assumed reflection characteristic of the object desirably provides a unique reflectance when a certain surface normal and a certain light source position are given. However, when the reflection characteristic is unknown, the reflection characteristic may be approximated with the above-mentioned Lambert's reflection model according to the Lambert's cosine law. As illustrated in FIG. 16, the specularly reflected component is reflected with a reflectance dependent on an angle formed by a bisector between a light source vector s and a viewing direction vector v with a surface normal n. Thus, the reflection characteristic described above may be based on the viewing direction. The luminance information used in the photometric stereo method may exclude influence of any light source such as ambient light other than a known light source by capturing images when the known light source is lit and when the known light source is not lit and by calculating a difference between these images. The following describes a case in which the Lambert's reflection model is assumed.

When i represents the luminance of the reflected light, $\rho_d$ represents a Lambert's diffuse reflectance of the object, E represents an intensity of an incident light, s represents a unit vector (light source direction vector) indicating a direction from the object to the light source, and n represents a unit surface normal vector of the object, the Lambert's cosine law gives an expression below.

$$i = E\rho_d s \cdot n \quad (9)$$

When i1, i2, . . . , iM represent luminance values obtained in M (M≥3) different light source directions s1, s2, . . . , sM, Expression (9) can be rewritten as below.

$$\begin{bmatrix} i_1 \\ \vdots \\ i_M \end{bmatrix} = \begin{bmatrix} s_1^T \\ \vdots \\ s_M^T \end{bmatrix} E\rho_d n \quad (10)$$

In Expression (10), a left-hand side is a luminance vector of M rows and 1 column, and [s1T, . . . , sMT] on a right hand side is an incident light matrix S of M rows and 3 columns indicating the light source direction. In addition, n represents a unit surface normal vector of 3 rows and 1 column. When M=3, multiplying an inverse matrix of the incident light matrix S from the left of Expression (10) yields E$\rho_d$n as described below.

$$E\rho_d n = S^{-1} \begin{bmatrix} i_1 \\ \vdots \\ i_M \end{bmatrix} \quad (11)$$

A norm of a vector on a left-hand side of Expression (11) is a product of E and $\rho_d$, and a vector normalized by this norm is obtained as the surface normal vector of the object. Since E and $\rho_d$ appear only as a product in this conditional expression, taking E$\rho_d$ to be one variable allows Expression (11) to be regarded as a set of simultaneous equations that provides three unknown variables including the two degrees of freedom of the unit surface normal vector. Thus, acquiring the luminance information under three light source conditions provides three equations, which enabling providing the solution. When the incident light matrix S is not a regular matrix, no inverse matrix thereof exists, the light source directions s1 to s3 need to be selected such that the incident light matrix S becomes a regular matrix. Thus, the light source direction s3 is desirably selected to be linearly independent from the light source directions s1 and s2.

On the other hand, when M>3, a larger number of conditional expressions are obtained than that of the unknown variables to be calculated. In this case, the surface normal vector can be calculated from three optionally selected conditional expressions by the above-described method. When four or more conditional expressions are used, the incident light matrix S is no longer a square matrix, and thus an approximate solution may be calculated using, for example, a Moore-Penrose pseudo inverse matrix. Alternatively, a solution may be calculated by a known fitting method or optimizing method in place of a matrix calculation. When the reflection characteristic of the object is assumed by using a model other than the Lambert reflection model, a resulting conditional expression may not be a linear equation of each component of the unit surface normal vector n. In such a case, three or more equations can be obtained for the three unknown variables, and the known fitting method or optimizing method can be used. When M>3, multiple combinations of three or more and M−1 or less of condition expressions are obtained, and thus multiple surface normal candidates can be calculated. In this case, a solution may be selected by the method disclosed in Japanese Patent Laid-open No. 2010-122158 or a method described later.

Furthermore, the calculation of the surface normal vector may use a combination of the luminance information under different light source conditions and the polarization information. For example, when M=2 in Expression (10), a smaller number of conditional expressions are obtained than that of the unknown variables, which does not enable to specify the surface normal and, however, enables to provide a relational expression to be satisfied by a component of the surface normal. Specifically, dividing sides of one of the two obtained conditional expressions by sides of the other to delete a term of $E\rho_d$ can provide a relational expression only with a component of the unit surface normal vector n. Since the unit surface normal vector n has the two degrees of freedom as described above, the remaining one degree of freedom may be set under another conditional expression. The other conditional expression may be obtained by using, for example, the above-described polarization information such as the polarization direction and the polarization degree.

Alternatively, the surface normal information may be acquired from each of the polarization information and the change of the luminance information depending on the light source positions. In this case, surface normals respectively acquired therefrom are true solution candidate. Then, a solution may be selected from these multiple solution candidates by a method described later.

When such multiple solution candidates for the surface normal vector are obtained, a solution may be selected under another different condition. For example, continuity of the surface normal vectors may be used as a condition. In order to calculate the surface normals for respective pixels of the image capturing apparatus, such a solution that an evaluation function expressed by following Expression (12) becomes minimum may be selected as the surface normal $n(x, y)$ at a target pixel $(x, y)$, if $n(x-1, y)$ is known.

$$1 - n(x,y) \cdot n(x-1,y) \tag{12}$$

When $n(x+1, y)$ and $n(x, y\pm1)$ are known, such a solution may be selected that Expression (13) below becomes minimum.

$$4 - n(x,y) \cdot n(x-1,y) - n(x,y) \cdot n(x+1,y) - n(x,y) \cdot n(x,y-1) - n(x,y) \cdot n(x,y+1) \tag{13}$$

When there is no known surface normal and the surface normals at all pixel positions each have an indefiniteness, such a solution may be selected that Expression (14) below as a sum over the all pixels is at minimum.

$$\sum_{x,y} 4 - n(x, y) \cdot n(x-1, y) - n(x, y) \cdot n(x+1, y) - n(x, y) \cdot n(x, y-1) - n(x, y) \cdot n(x, y+1) \tag{14}$$

These selection methods are exemplary. The surface normal information for pixels other than pixels nearest to the target pixel may be used, or an evaluation function weighted depending on a distance from a position of the target pixel may be used.

The selection of a solution from multiple candidates may use depth information. The depth information can be acquired by a method such as triangulation using a laser light and a binocular stereo method. The surface normal vector can be calculated by converting a three-dimensional shape calculated from the depth information into the surface normal information. As described above, the surface normal vector calculated by this method does not have a sufficient accuracy. However, when multiple solution candidates for the surface normal vector are previously obtained, these solution candidates may be used as reference information for selecting one solution. In other words, one of the multiple solution candidates for the surface normal vector, which is nearest to the surface normal vector calculated from the depth information may be selected.

Alternatively, the polarization degree may be used. As illustrated in FIGS. 15A and 15B, when the polarization degree is small, the incident angle of the specularly reflected component is near 0° or 90°, and the reflection angle of the diffusely reflected component is near 0°. Thus, for example, when the polarization degree is smaller than 0.1, among the multiple candidates for the surface normal vector, one near the viewing direction may be selected. In the specular reflection, a candidate nearest to the viewing direction or a direction orthogonal to the viewing direction may be selected.

Alternatively, the luminance information at an optional light source position may be used. In a diffuse reflection model typified by the Lambert reflection model, the reflected light has a larger luminance as the surface normal vector and the light source direction are closer to each other. Thus, the surface normal vector closer to a direction in which the luminance is larger may be selected on a basis of the luminance values in multiple light source directions. In a specular reflection model, where v represents a unit vector from the object toward the image capturing apparatus (that is, the viewing direction vector of the image capturing apparatus), Expression (15) below holds for a smooth surface.

$$s + v = 2(v \cdot n)n \tag{15}$$

Thus, when the light source direction vector s and the viewing direction vector v of the image capturing apparatus are known, the surface normal n can be calculated. For a typical surface being rough, the reflection angle has a spread in the specular reflection, the spread exists around a solution calculated by assuming that the typical surface is a smooth surface, one of the multiple solution candidates, which is closest to the solution for the smooth surface, may be selected.

Alternatively, a true solution may be calculated as an average of the multiple solution candidates.

The following embodiments produce, by using a captured image obtained by image capturing of an object, surface normal information on a surface of the object. An image acquirer acquires luminance information images (first images) as multiple captured images in which light source positions relative to the object are mutually different, and polarization images (second images) as three or more captured images in which polarization states are mutually different. An area divider performs area division of the surface of the object (that is, an object image acquired by image capturing; a third image) depending on at least one of luminance information that changes corresponding to the light source positions relative to the object and that is acquired from the multiple luminance information images and the polarization information acquired from the three or more polarization images. The third image may be the first or second image, and may be an image viewed from a viewpoint different from those for the first and second images. The third image does not necessarily need to be a two-dimensional image and may be, for example, a 3D model of the object. The area division may be performed on the 3D model. When areas in multiple images such as the first images, the second images and other images correspond to an identical area (point) of the object, the area division can be performed with correspondence between the areas, as described later.

Then, a surface normal estimator (producer) selects, for each divided area obtained by the area division, information to be used in production (estimation) of the surface normal information, from information relating to change of the luminance information corresponding to the light source positions and the polarization information to perform the production of the surface normal information.

Acquiring the multiple captured images in which the light source positions are mutually different enables acquiring the surface normal of the object line information by the method described above from the information relating to change of the luminance information corresponding to the light source positions (hereinafter simply referred to as "change of the luminance information corresponding to the light source positions"). Acquiring three or more polarization images in which the polarization states are mutually different enables acquiring the surface normal of the object line information by the method described above from the polarization information. The surface normal information includes information for selecting at least one candidate for one degree of freedom of the surface normal, information for selecting a true solution from among multiple solution candidates for the surface normal and information relating to validity of the calculated surface normal.

The surface normal information corresponding to each divided area is estimated by using at least one of the change of the luminance information corresponding to the light source positions and the polarization information. In this manner, estimating a surface normal by a different method for each divided area on the object enables acquiring robust surface normal information for a common object.

In the following embodiments, it is desirable that the estimation of the surface normal information using the change of the luminance information corresponding to the light source positions may be performed with a configuration including a model error amount calculator (model error acquirer) that estimates the surface normal information by using a reflection characteristic model and calculates (acquires) a model error amount between the luminance information and the reflection characteristic model and then performing the area division on a basis of the model error amount.

In the photometric stereo method, the estimation of the surface normal information using the change of the luminance information corresponding to the light source positions uses the reflection characteristic model. The reflection characteristic model uniquely provides the reflectance in a certain angle direction for a relation between the surface normal of the object and the light source direction vector. Alternatively, as described above, the reflection characteristic model may have a characteristic based on the viewing direction. As the reflection characteristic model, for example, a function of an angle formed by the surface normal of the object with the light source direction vector, which expresses the reflectance of the object, may be used. Widely used models include a Phong model, a Torrance-Sparrow model, a Cook-Torrance model, an Oren-Nayer model and others, as well as the Lambert model described above. The estimation of the surface normal information may be performed by calculating the model error amount between the luminance information obtained by the image acquirer and this reflection characteristic model. Validity of the surface normal information obtained from this model error amount can be determined. The area division to estimate the surface normal information can be appropriately performed on the basis of the model error amount.

The model error amount may be calculated by using a comparison result between the luminance information and the luminance value calculated by using the reflection characteristic model.

Alternatively, the model error amount may be calculated by using the luminance information and a parameter of a model applied to the reflection characteristic model.

Alternatively, the model error amount may be calculated by using a variation of the multiple candidates for the normal line to the surface of the object calculated from the luminance information.

The reflection characteristic model may be the Lambert model. The diffusely reflected component is likely to obey the Lambert model, and thus use of the Lambert model as the reflection characteristic model enables relatively accurately estimating the surface normal information for part of the object with less specular reflection. Since the luminance is calculated as an inner product of the surface normal vector and the light source direction vector, a fast estimation of the surface normal information can be performed by a simple matrix calculation.

Furthermore, the estimation of the surface normal information using the reflection characteristic model may be performed for at least one divided area where the model error amount is smaller than a first model error amount as a threshold. Setting the threshold for the model error amount allows determining that the estimation of the surface normal information using the reflection characteristic model has a high validity for the area where the model error amount is smaller than the threshold. A robust estimation of the surface normal information can be performed for such an area by using the reflection characteristic model.

Moreover, the estimation of the surface normal information using the polarization information may be performed for at least one divided area where the model error amount is larger than a second model error amount as another threshold. Setting the threshold for the model error amount allows determining that the estimation of the surface normal information using the reflection characteristic model has a low validity for the area where the model error amount is larger than the threshold. A robust estimation of the surface normal information can be performed for such an area by using the polarization information. The first model error amount and the second model error amount may be different from or identical to each other.

In the estimation of the surface normal information using the polarization information, such a configuration may be employed which includes a reliability calculator (reliability acquirer) that calculates (acquires) a reliability of the estimation of the surface normal information using the polarization information and in which the area divider may perform the area division based on the reliability. In the estimation of the surface normal information, the reliability of the estimation of the surface normal information using the polarization information allows determination of a validity of the surface normal information obtained from the polarization information. The area division based on this reliability enables performing an appropriate area division to estimate the surface normal information.

The reliability calculator may calculate the reliability by using information of the polarization degree included in the polarization information.

Alternatively, the reliability calculator may calculate the reliability by using a difference between a maximum value and a minimum value of the luminance of the polarized light; the values are included in the polarization information.

Alternatively, the reliability calculator may calculate the reliability by using information on the polarization direction, which is included in the polarization information.

Then, the estimation of the surface normal information using the polarization information may be performed for at least one divided area where the reliability is higher than a first reliability as a threshold. Setting the threshold for the reliability allows determining that the estimation of the surface normal information using the polarization information has a high validity for the area where the reliability is higher than the threshold. A robust estimation of the surface normal information can be performed for such an area by using the polarization information. The threshold may be experimentally set, and, for example, a threshold of 0.1 may be set when the polarization degree is used as the reliability.

The estimation of the surface normal information using the change of the luminance information corresponding to the light source positions may be performed for at least one divided area where the reliability is smaller than a second reliability as another threshold. Setting the threshold for the reliability allows determining that the estimation of the surface normal information using the polarization information has a low validity for an area where the reliability is lower than the threshold. A robust estimation of the surface normal information can be performed for such an area by using the change of the luminance information corresponding to the light source positions. The first reliability and the second reliability may be different from or identical to each other.

The image capturing apparatus may include the image capturing unit (image capturer) that performs image capturing of the object and the surface normal information producing apparatus. Such an image capturing apparatus may include a light projector that illuminates the object with a projected light and a mechanism capable of setting multiple light-projection positions of the light projector.

Furthermore, the image capturing apparatus may acquire multiple parallax images having a parallax therebetween. Obtaining the change of the luminance information corresponding to the light source positions and the polarization information from different viewpoints enables acquisition of more surface normal information than that obtained from a single viewpoint.

Moreover, the image capturing unit may include the image-capturing optical system and the image sensor and may guide multiple light fluxes passing through mutually different areas of a pupil of the image-capturing optical system to mutually different pixels of the image sensor so as to perform a photoelectric conversion. Guiding the multiple light fluxes passing through the mutually different areas of the pupil of the image-capturing optical system to the mutually different pixels of the image sensor enables acquisition of information from different viewpoints.

The image capturing unit may include the image-capturing optical system and the image sensor. The image sensor includes multiple pixel pairs photoelectrically converting the light fluxes from the mutually different areas of the pupil of the image-capturing optical system and micro lenses each provided for each pixel pair.

The image capturing apparatus may acquire at least one viewpoint, as the parallax images, the multiple captured images in which the light source positions are mutually different and may acquire at each of at least two viewpoints three or more polarization images in which the polarization states are mutually different.

Embodiment 1

Figure 2:
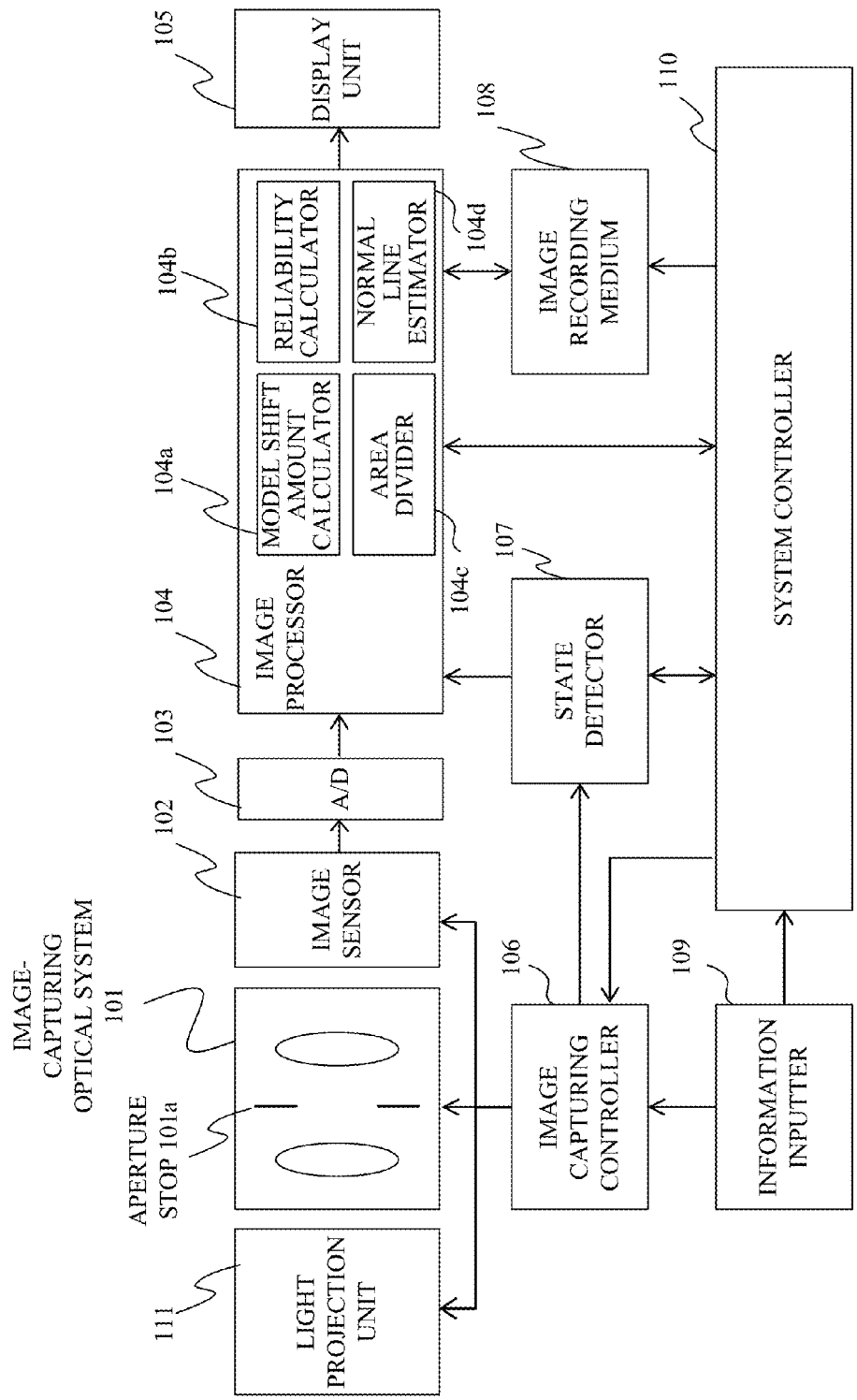
FIG. 2 is a block diagram of a basic configuration of the image capturing apparatus of Embodiment 1.

FIG. 2 illustrates a basic configuration of the image capturing apparatus that is Embodiment 1 of the present invention. An image-capturing optical system 101 including an aperture stop 101a causes light from an object (not illustrated) to form an image thereof on an image sensor 102. The image sensor 102 is constituted by a photoelectric conversion element such as a CCD sensor or a CMOS sensor. The image-capturing optical system 101 and the image sensor 102 constitute an image capturing unit.

An analog electric signal produced through a photoelectric conversion by the image sensor 102 is converted into a digital signal by an A/D converter 103 and input to an image processor 104 as a surface normal information producing apparatus. The image processor 104 performs, in addition to typical image processes performed on the digital signal, a process to estimate surface normal information of the object.

The image processor 104 includes a model error amount calculator 104a that calculates, in an estimation of the surface normal information using a reflection characteristic model, a model error amount between luminance information (described later) and the reflection characteristic model, and a reliability calculator 104b that calculates, in an estimation of the surface normal information using polarization information, a reliability of that estimated surface normal information. The image processor 104 further includes an area divider 104c that performs area division on an acquired image and a surface normal estimator 104d that estimates the surface normal information.

An output image processed by the image processor 104 is stored in an image recording medium 108 such as a semiconductor memory and an optical disk. The output image may be displayed on a display unit 105.

An information inputter 109 detects information of a desired image-capturing condition (an aperture value, an exposure time, a light projection condition and others) selected and input by a user and supplies data of the information to a system controller 110. An image capturing controller 106 moves a focus lens (not illustrated) of the image-capturing optical system 101 on a basis of information from the system controller, and acquires a required image by controlling the light projection unit 111, the aperture value of the image-capturing optical system, the exposure time and the image sensor 102. A state detector 107 acquires current image-capturing condition information in response to a control instruction from the system controller 110. The image-capturing optical system 101 may be integrated with the image sensor 102 or an image-capturing optical system detachably attachable to an lens-interchangeable image capturing apparatus such as a single-lens reflex camera.

Figure 1:
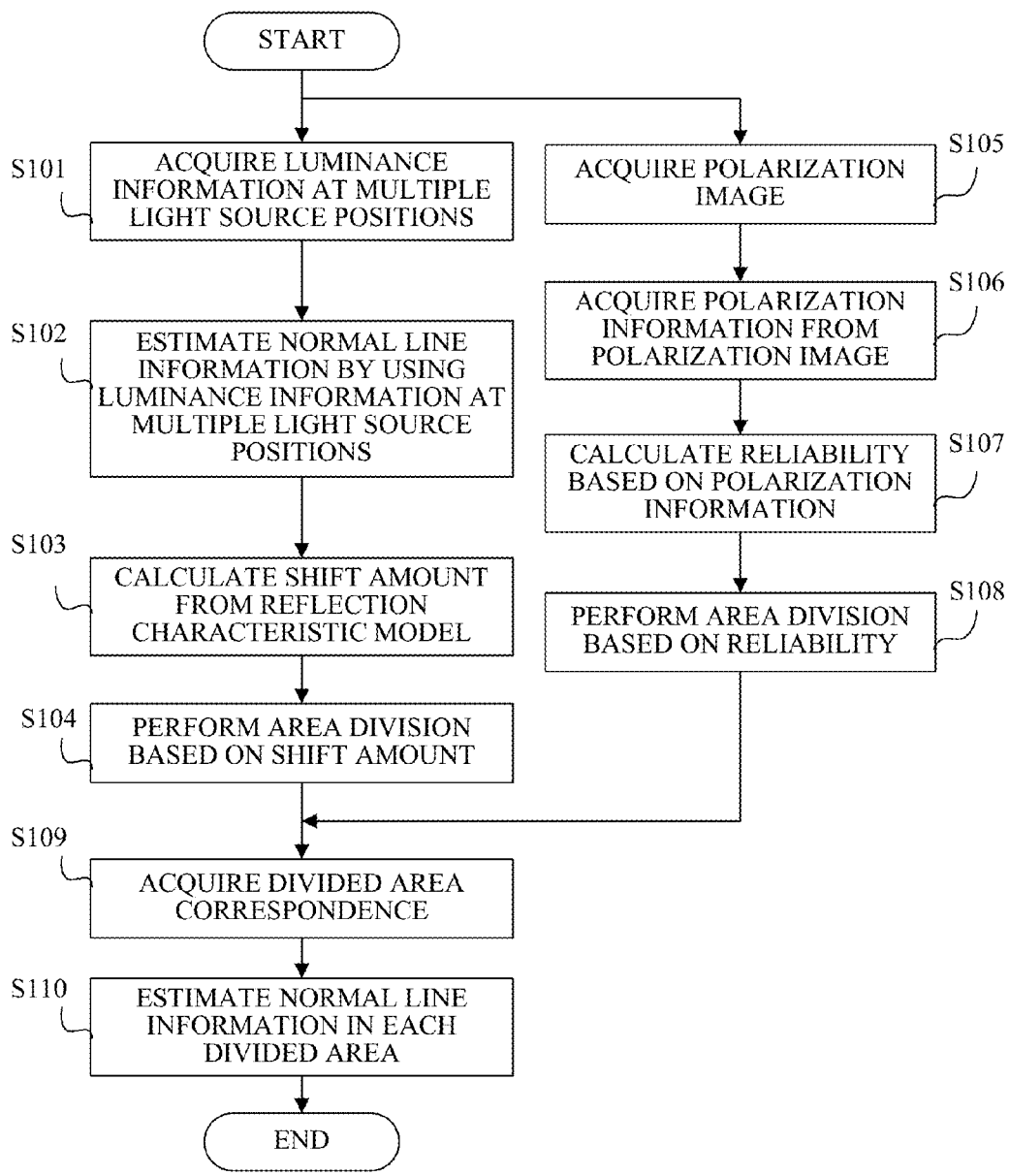
FIG. 1 is a flowchart illustrating an estimation process of surface normal information, which is performed by an image capturing apparatus that is Embodiment 1 of the present invention.

FIG. 1 illustrates a flowchart of a procedure of the estimation of the surface normal information described above. This estimation is executed by the system controller 110 and the image processor 104 according to a surface normal information producing program as a computer program. This is the same in other embodiments described later.

At step S101, the system controller 110 controls the image capturing unit constituted by the image-capturing optical system 101 and the image sensor 102 to capture the images of the object at multiple light source positions. The system controller also controls the light projection unit 111 to adjust a light source intensity and set the light source positions. The light source positions may be set by placing a single light projection unit at different positions in turn, or by providing multiple light projection units.

At step S102, the system controller 110 causes the image processor 104 to estimate the surface normal information using the digital signal obtained through the A/D conversion performed by the A/D converter 103 on the analog signal output from the image sensor 102. The image processor 104 may perform a normal development process and various image correction processes to produce parallax images. The surface normal estimator 104d performs the estimation of the surface normal information by the photometric stereo method, that is, by using the change of the luminance information corresponding to the light source positions.

At step S103, the model error amount calculator 104a calculates, by using the surface normal information estimated at step S102, the model error amount between the luminance information and the reflection characteristic model.

Detailed description will be made of a process performed by the model error amount calculator 104a. When surface normal candidates of the object are estimated, a reflectance of the object based on the reflection characteristic model can be calculated from a surface normal direction and a known light source direction. Thus, a relation between the luminance information at the respective light source positions is obtained by using the reflection characteristic model. Therefore, acquiring for each pixel a difference between a luminance value of the object obtained through the image capturing unit and a luminance value obtained by using the reflection characteristic model and calculating a root mean square (RMS) enables providing a model error amount between an actually measured luminance value and the reflection characteristic model.

When the light source intensity on the object is unknown, an absolute value of the luminance information at each light source position cannot be determined, each luminance value may be normalized with an appropriate value such as a maximum luminance detectable by the image capturing apparatus. When the Lambert model is used, the normalization may be performed with the value of $E\rho_d$ obtained by the photometric stereo method. In this case, an inner product $s \cdot n$ of the light source direction vector s and the surface normal n corresponds to the normalized luminance information. Since any differences in the light source intensity and the reflectance among the pixels are canceled, the calculated model error amount can be set as an index common to the pixels.

Alternatively, the model error amount may be calculated by using the luminance information and a parameter of a model applied to the reflection characteristic model. In an example of performing the surface normal estimation using the Lambert model, the product $E\rho_d$ of the light source intensity and the Lambert reflectance is expected to be substantially constant for objects of an identical material. Thus, a difference value at a target pixel from an average value or median of $E\rho_d$ calculated for points on multiple objects of an identical material can be used as the model error amount. When the light source intensity illuminating the object is known, $\rho_d$ may be directly used. This can eliminate any error due to difference in the light source intensities illuminating mutually different positions. Determining regions of an identical material on the object may be performed by using an existing area division method such as a Graph-Cut method, a watershed method or a mean-shift method. Alternatively, such a simple assumption may be made that mutually neighboring pixels are of an identical material. When the material of the object is known, a difference from a known $\rho_d$ may be calculated.

The above discussion can be applied to the surface normal information estimation using other reflection characteristic model. For example, in a simplified Torrance-Sparrow model, as illustrated in FIG. 16, using a reflection coefficient K, a reflection angle θr, a surface roughness σ and an angle α formed by a bisector direction of the light source direction s and a viewing direction v with a surface normal direction n provides Expression (16).

$$i = E\rho_d s \cdot n + \frac{K}{\cos\theta_r}\exp\left[-\frac{\alpha^2}{2\sigma^2}\right] \tag{16}$$

The reflection coefficient K and the surface roughness σ each depend on the material of the object and are each constant for an identical material. Thus, the model error amount can be calculated by using these values in place of $\rho_d$.

Alternatively, the model error amount may be calculated by using a variation of multiple surface normal candidates calculated from the luminance information. When the surface normal is acquired at a sufficiently fine pitch relative to change of the surface normal on the object, the surface normal directions at mutually neighboring pixels are mutually similar. Thus, for example, calculating a model error amount of the surface normal directions among the pixels by using the evaluation function of Expression (12) enables a determination of estimation accuracies of the obtained surface normal candidates.

As described above, the model error amount can be calculated by various methods. Any of the methods described above may be used, and other methods than the above-described methods may be used.

At step S104, the area divider 104c performs the area division of an object image (in other words, of a surface of the object) on a basis of the model error amount calculated at step S103.

Detailed description will be made of a process performed by the area divider 104c when the area division based on the model error amount is performed. The area divider 104c sets a threshold (first and second model error amounts) th for a model error amount e obtained at step S103. Specifically, using a comparison result between the model error amount e and the threshold th, the area divider 104c performs the area division on a basis of expressions below.

$$e \leq th \tag{17}$$

$$th < e \tag{18}$$

For a pixel that satisfies Expression (17), the model error amount between the actually measured luminance value and the reflection characteristic model is small, so that a divided area including this pixel is set as a high model-fitting degree area. On the other hand, for a pixel that satisfies Expression (18), the model error amount between the actually measured luminance value and the reflection characteristic model is large, so that a divided area including this pixel is set as a low model-fitting degree area. The threshold may be experimentally set. For example, the actually measured luminance value and a luminance value based on the reflection characteristic model may be normalized so that a maximum value of the actually measured luminance value is 1, and the threshold th may be set to 0.1 when a maximum value of a difference between these normalized values is set as the model error amount e.

Alternatively, multiple thresholds may be set as described below. Expressions (19) to (21) below include thresholds (first and second model error amounts) th1 and th2.

$$e \leq th1 \quad (19)$$

$$th1 < e \leq th2 \quad (20)$$

$$th2 < e \quad (21)$$

For a pixel that satisfies Expression (19), the model error amount between the actually measured luminance value and the reflection characteristic model is small, so that a divided area including this pixel is set as a high model-fitting degree area. A divided area including a pixel that satisfies Expression (20) is set as a middle model-fitting degree area. For a pixel that satisfies Expression (21), the model error amount between the actually measured luminance value and the reflection characteristic model is large, so that a divided area including this pixel is set as a low model-fitting degree area.

The model error amount may be calculated by using part of the luminance information acquired for each light source positions. Typical cases in which the model error amount is large include a case in which a physical reflection characteristic of the object does not match the reflection characteristic model used. The typical cases further includes another case in which a specularly reflected component or an interreflected component is observed when using a reflection characteristic model expecting observation of shaded and shadow portions where a light from a light source is blocked and thereby does not reach or observation of a diffusely reflected component. In these cases, though the physical reflection characteristic of the object matches the model, observed luminance information does not match the model. For a large model error amount from the reflection characteristic model, a correct surface normal cannot be obtained by the photometric stereo method, and thus a validity of the surface normal information obtained by the photometric stereo method can be determined based on the model error amount in both the above cases.

However, in the latter case, a match to the model may be achieved by calculating the model error amount without the luminance information of the shaded and shadow portions and a light source position at which an unexpected reflected component is observed. Thus, when the luminance information is available at light source positions in a larger number than a number sufficient for the surface normal estimation, the model error amount may be calculated without using the luminance information acquired at the above-described inappropriate light source position.

Whether or not a light source position at which certain luminance information is acquired is inappropriate may be determined by existing methods of extracting the shaded and shadow portions and a specular reflection portion; for example, a threshold process may be performed on the luminance information. When a result of extraction of the shaded and shadow portions or specular reflection portion shows that the luminance information acquired at light source positions available for the surface normal estimation is insufficient, the portion may be set as the low model-fitting degree area by a method of setting the model error amount to a maximum value.

At step S105, in parallel to step S101, the image processor 104 acquires three or more polarization images in which the polarization states are mutually different. The polarization image is an image acquired by capturing the luminance information of only a certain polarization component of a reflected light from the object. Although not illustrated in FIG. 1, the polarization images can be acquired by using an image-capturing optical system and an image sensor which are different from those used for the luminance information. A method of acquiring the polarization images may capture images while changing a transmission axis angle direction of a polarizer provided in front of, behind or inside the image-capturing optical system. Another method of acquiring the polarization images uses a pattern polarizer disposed in front of the image sensor (refer to Japanese Patent Laid-open No. 2007-86720).

Figure 17:
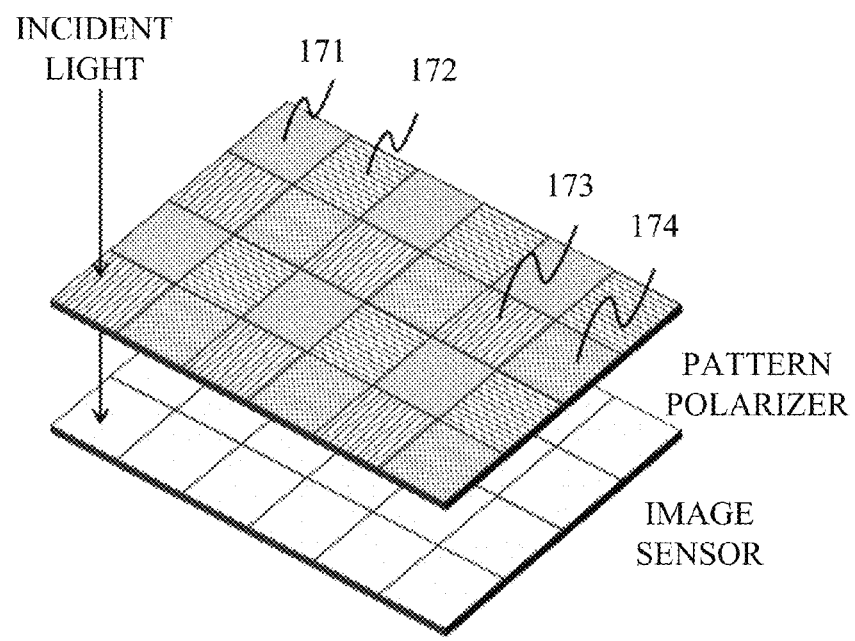
FIG. 17 illustrates a pattern diagram of an image sensor on which a pattern polarizer is disposed.

FIG. 17 illustrates that the pattern polarizer is disposed in front of the image sensor. The pattern polarizer is disposed such that only a specific polarization component of an entering light enters pixels of the image sensor. In FIG. 17, four types of polarizers 171 to 174 are disposed, which are, for example, polarizers having transmission axes different from each other by 45 degrees. Disposing the four type polarizers 171 to 174 as a set and assuming that mutually neighboring pixels observe a reflected light from an identical point on an object enables acquiring polarization information equivalent to that acquired by image capturing while changing a transmission axis angle direction of one polarizer.

At step S106, the image processor 104 calculates the polarization information by the method described above from the polarization images obtained at step S105. Since the average luminance value Iave obtained is equal to the luminance value of the reflected light from the object, this Iave can be used as the luminance information used at step S101. In this case, at step S105, the luminance information and the polarization images can be acquired simultaneously by an identical image capturing apparatus.

At step S107, the reliability calculator 104b calculates the reliability mentioned above by using the polarization information obtained at step S106. Typically, a larger polarization degree allows a more accurate estimation of the polarization information, and thus the reliability calculator 104b may use the polarization degree as the reliability.

Alternatively, the reliability calculator 104b may calculate the reliability by using a difference between a maximum value Imax and a minimum value Imin as luminance values of a polarized light. More simply, the reliability may be set as a difference between maximum and minimum values of luminance values of corresponding pixels in three or more polarization images obtained. An estimation accuracy of the polarization information is affected by noise of the image acquirer and a disturbance such as an interreflected light or an ambient light. Since a larger difference between the maximum and minimum values of the luminance of the polarized light is likely to lead to less influence of these disturbances, this difference can be used as the reliability.

At step S108, the area divider 104c performs area division of the object image on a basis of the reliability obtained at step S107.

Detailed description will be made of a process performed by the area divider 104c when the area division based on the reliability is performed. The area divider 104c sets the threshold th for the reliability r obtained at step S107. Specifically, using a comparison result between the reliability r and the threshold (first and second reliabilities) th and the area divider 104c performs the area division based on expressions below.

$$r \leq th \quad (22)$$

$$th < r \quad (23)$$

A divided area including a pixel that satisfies Expression (22) is set as a low reliability area, and a divided area including a pixel that satisfies Expression (23) is set as a high reliability area. The threshold may be experimentally set. For example, the threshold th may be set to 0.1 when the polarization degree is used as the reliability r.

Alternatively, multiple thresholds may be set as described below. Expressions below include thresholds (first and second reliabilities) th1 and th2.

$$r \leq th1 \tag{24}$$

$$th1 < r \leq th2 \tag{25}$$

$$th2 < r \tag{26}$$

A divided area including a pixel that satisfies Expression (24) is set as a low reliability area, a divided area including a pixel that satisfies Expression (25) is set as a middle reliability area, and a divided area including a pixel that satisfies Expression (26) is set as a high reliability area.

The reliability may be calculated by using at least part of the acquired polarization information.

At step S109, the image processor 104 acquires correspondences between the divided areas obtained through the area division based on the model error amount and the divided areas obtained through the area division based on the reliability. When the luminance information and the polarization information are acquired by an identical image capturing apparatus, pixels at an identical position correspond to each other. When the luminance information and the polarization information are acquired at mutually different viewpoints, the image processor 104 performs a corresponding-point extraction by, for example, an existing block matching method to correlate the model error amount and the reliability to an identical point of the object.

At step S110, the surface normal estimator 104d selects information to be used in the estimation of the surface normal information and performs the estimation thereof for each divided area obtained by the area division at steps S104, S108, and S109. When a point (pixel) on the object belongs to the high model-fitting degree area and the low reliability area, the surface normal estimator 104d estimates the surface normal information from the change of the luminance information corresponding to the light source positions. When a point on the object belongs to the low model-fitting degree area and the high reliability area, the surface normal estimator 104d estimates the surface normal information from the polarization information. That is, the surface normal estimator 104d estimates the surface normal information by the photometric stereo method in the high model-fitting degree area and by the polarization information in the high reliability area. When a point on the object belongs to the high model-fitting degree area and the high reliability area, the surface normal estimator 104d may estimate the surface normal information by any one of the methods. Alternatively, the surface normal estimator 104d may use an average value of the surface normal information estimated by the both methods may be used. When a point on the object belongs to the low model-fitting degree area and the low reliability area, the surface normal estimator 104d also may estimate the surface normal information by any one of the methods and use the average value of the surface normal information estimated by the both methods. The surface normal estimator 104d may interpolate the surface normal information of a target pixel by using the surface normal information of surrounding pixels. The estimation of the surface normal information using the change of the luminance information corresponding to the light source positions and the estimation of the surface normal information using the polarization information may be performed by the method described above.

Figure 3:
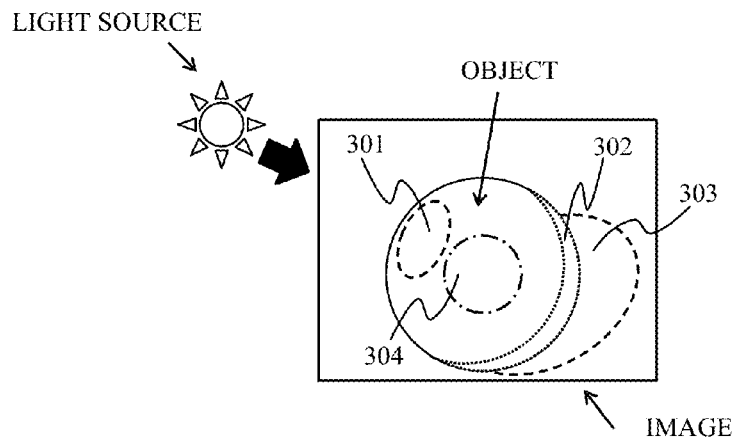
FIG. 3 is a pattern diagram of an acquired image in Embodiment 1.

FIG. 3 illustrates a captured image obtained by image capturing of a spherical object from an illustrated light source position. The captured image includes a specular reflection portion 301, a shaded portion 302 and a shadow portion 303; the shaded and shadow portions 302 and 303 are portions where any light does not reach. Since the polarization degree of a diffusely reflected component is low on a surface facing an image capturing apparatus (camera), a low-polarization degree portion 304 exists on the surface. Also in this case, the surface normal information is estimated by using the multiple images (that is, the luminance information) in which the light source positions are mutually different and the three or more polarization images in which the polarization states are mutually different at least one light source position.

When the object includes the shaded portion 302 or the shadow portion 303 at a certain light source position, the luminance information is not acquired at the light source position, which causes insufficiency of the luminance information and may make it difficult to perform the surface normal estimation by the photometric stereo method. On the other hand, even in such a case, since the surface normal estimation using the polarization information is a passive method, the surface normal information can be estimated. When the specular reflection portion 301 exists, the photometric stereo method may not be able to perform an accurate surface normal estimation because of, for example, a large luminance change of the specularly reflected component depending on a viewing angle.

However, since the specularly reflected component is likely to have a larger polarization degree than that of the diffusely reflected component, performing the surface normal estimation using the polarization information enables an accurate estimation of the surface normal information. When the object is one for which the reflection characteristic model cannot be assumed, the photometric stereo method cannot be used but the surface normal information can be estimated by using the polarization information. On the other hand, since a surface facing the camera has a low polarization degree, it is difficult to perform the surface normal estimation using the polarization information, but the surface is unlikely to have a shadow thereon, which is an advantageous condition for the photometric stereo method. The surface normal estimation using the polarization degree in other cases requires acquiring a refractive index of the object. However, the surface normal information can be highly accurately estimated by the photometric stereo method. In this manner, when the surface normal information is estimated by using the change of the luminance information corresponding to the light source positions or the polarization information, one thereof is used for a divided area for which the surface normal information is difficult to be estimated by the other. Thus, the estimation of the surface normal information based on the area division as described above for a certain point on the object can provide robust surface normal information for a wider range of common objects.

Embodiment 2

Next, description will be made of an estimation process of the surface normal information by an image capturing apparatus that is Embodiment 2 of the present invention with reference to FIG. 4. This embodiment is different from Embodiment 1 in that both of the model error amount and the reliability are simultaneously used in area division. The image capturing apparatus of this embodiment has the same basic configuration as that of the image capturing apparatus of Embodiment 1.

Figure 4:
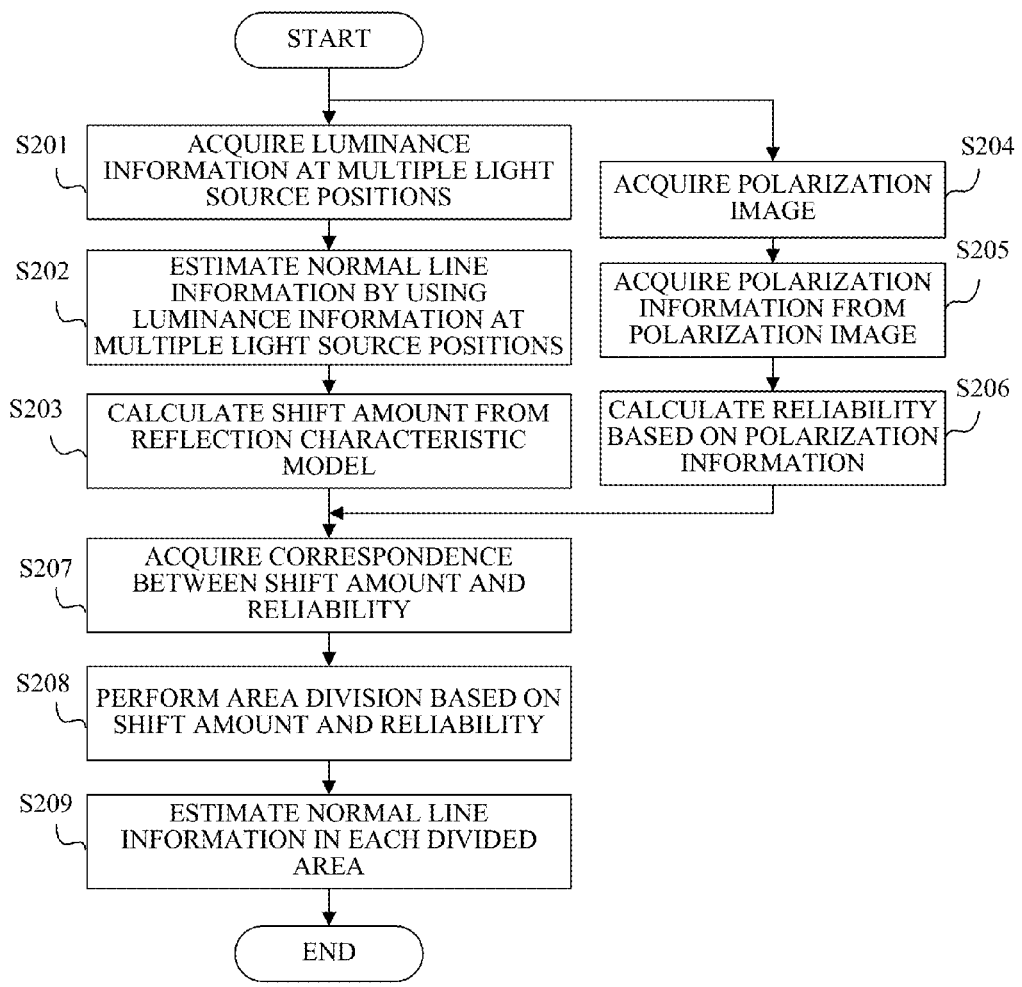
FIG. 4 is a flowchart illustrating an estimation of surface normal information performed by an image capturing apparatus that is Embodiment 2 of the present invention.

In FIG. 4, steps S201 to S203 are the same as steps S101 to S103 in Embodiment 1 (FIG. 1). In addition, steps S204 to S206 are the same as steps S105 to S107 in Embodiment 1. Furthermore, at step S207, similarly to step S109, the image processor 104 acquires correspondences between the model error amounts e calculated at step S203 and the reliabilities r calculated at step S206 when different image capturing apparatuses and image-capturing conditions are used in acquisition of the luminance information and the polarization images.

At step S208, the area divider 104c performs the area division based on the model error amounts e calculated at step S203 and the reliabilities r calculated at step S206. Specifically, the area divider 104c calculates the model error amount in each pixel by using an RMS of differences between actually measured luminance values and luminance values calculated from the reflection characteristic model and the estimated surface normal information and sets the reliability r to the polarization degree. Then, the area divider 104c performs the area division based on expressions below.

$$k(1-r) \le e \qquad (27)$$

$$k(1-r) > e \qquad (28)$$

In the above expressions, k represents a constant for matching scales of the model error amount and the reliability; k may be experimentally selected. A divided area including a pixel that satisfies Expression (27) is set as a low model-fitting degree and high reliability area, and a divided area including a pixel that satisfies Expression (28) is set as a high model-fitting degree and low reliability area.

At step S209, the surface normal estimator 104d selects information to be used in the estimation of the surface normal information and performs the estimation thereof for each divided area obtained by the area division at step S208. When a point (pixel) on the object belongs to the high model-fitting degree and low reliability area, the surface normal estimator 104d estimates the surface normal information from the change of the luminance information corresponding to the light source positions. On the other hand, when a point on the object belongs to the low model-fitting degree and high reliability area, the surface normal estimator 104d estimates the surface normal information from the polarization information.

The estimation of the surface normal information from the change of the luminance information corresponding to the light source positions and the estimation of the surface normal information from the polarization information may be performed by the methods described above. The model error amount and the reliability may be calculated by other methods than the above-described methods.

Embodiment 3

Next, description will be made of an estimation process of the surface normal information by an image capturing apparatus that is Embodiment 3 of the present invention with reference to FIG. 5. This embodiment is different from Embodiment 1 in that multiple (paired) parallax images having a parallax therebetween are acquired. The image capturing apparatus of this embodiment has the same basic configuration as that of the image capturing apparatus of Embodiment 1.

Figure 5:
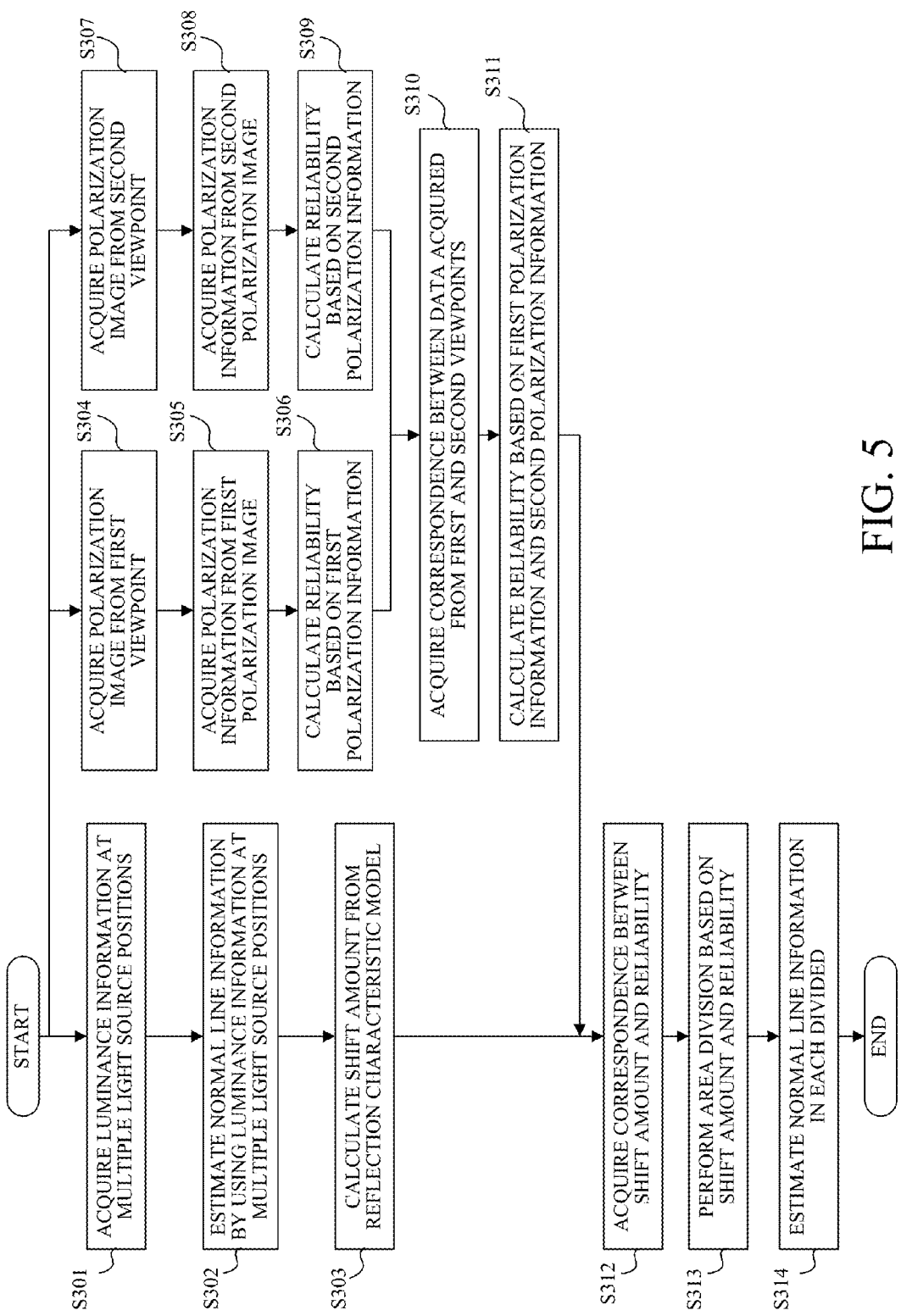
FIG. 5 is a flowchart of an estimation process of surface normal information, which is performed by an image capturing apparatus that is Embodiment 3 of the present invention.

In FIG. 5, steps S301 to S303 are the same as steps S101 to S103 in Embodiment 1 (FIG. 1). Steps S304 to S306 and steps S307 to S309 perform the same processes as those of steps S105 to S107 in Embodiment 1. However, the processes at steps S304 to S306 and steps S307 to S309 are respectively performed on images acquired by image capturing from a first viewpoint and a second viewpoint that are mutually different. Steps S312 to S314 are the same as steps S207 to S209 in Embodiment 2 (FIG. 4).

At step S310, the image processor 104 acquires correspondences between data acquired from the first viewpoint and data acquired from the second viewpoint. Specifically, the image processor 104 correlates data at a point acquired from the first viewpoint and data at a point acquired from the second viewpoint to an identical point of the object, on a basis of at least one of the polarization image, the polarization information and the reliability, by using the corresponding-point extraction by, for example, the existing block matching method as at step S109. The two points correlated to the identical point of the object are referred to as "corresponding points".

At step S311, the reliability calculator 104b calculates a reliability totaling the polarization information acquired from the first and second viewpoints by using the polarization information acquired at each of steps S305 and S308 and the reliability calculated at each of steps S306 and S309.

Description will be made of a case of calculating the reliability using the polarization information acquired at each of steps S305 and S308. As described above, the surface normal of the object can be estimated from the polarization direction viewed from multiple different viewpoints. In this case, as described above, as an angle formed by the incident surfaces viewed from two viewpoints is closer to 90 degrees, the estimation of the surface normal has a higher accuracy. Thus, the angle formed by the incident surfaces viewed from the two viewpoints can be used as the reliability. Since the incident surface obeys Expression (8), when dominant components of the diffusely reflected components and the specularly reflected components are common to the viewpoints, the angle between the polarization directions viewed from the viewpoints can be used as the reliability. For example, only one of the components is dominant for a plaster in which specular reflection is negligible and a metallic luster surface in which diffuse reflection is negligible.

Next, description will be made of a case of calculating the reliability by using the reliability calculated at each of steps S306 and S309. In this case, a comparison between a first reliability calculated by using first polarization information and a second reliability calculated by using second polarization information may be made between the corresponding points obtained at step S310, and the polarization information having a larger reliability may be used. The estimation of the surface normal information using the polarization information is perform at step S314 may use the polarization information obtained at a viewpoint having a larger reliability.

An image capturing unit that acquires multiple parallax images used in this embodiment introduces multiple light fluxes passing through mutually different areas of the pupil (exit pupil) of the image-capturing optical system 101 to mutually different light-receiving portions (pixels) of the image sensor 102 to perform photoelectric conversion.

Figure 6:
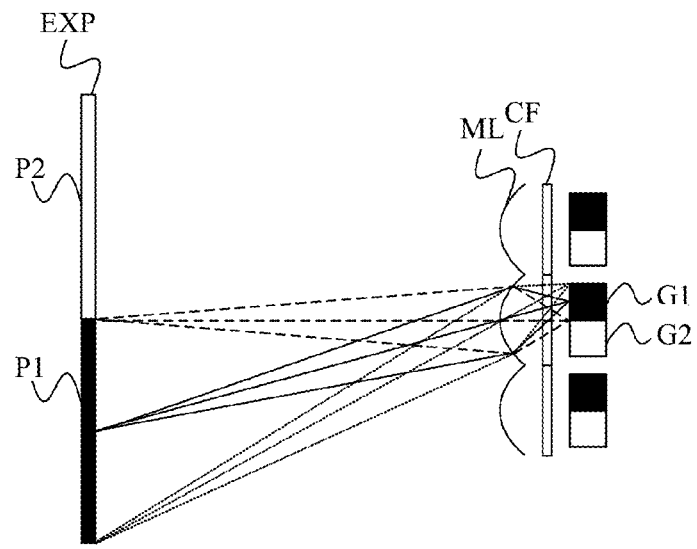
FIG. 6 illustrates a relation between an image sensor and a pupil of an image-capturing optical system in an image capturer of the image capturing apparatus of Embodiment 3.

FIG. 6 illustrates a relation between the light-receiving portions of the image sensor 102 in the image capturing unit of this embodiment and the pupil of the image-capturing optical system 101. In FIG. 6, ML represents a micro lens, and CF represents a color filter. EXP represents the exit pupil of the image-capturing optical system 101. G1 and G2 represents light-receiving portions (hereinafter respectively referred to as "a G1 pixel" and "a G2 pixel"); one G1 pixel and one G2 pixel form a pair. The image sensor 102 includes an array of multiple pairs (pixel pairs) of G1 and G2 pixels. The paired G1 and G2 pixels have a conjugate relation with the exit pupil EXP with respect to the micro lens ML common to the paired G1 and G2 pixels (in other words, the micro lens ML is provided for each pixel pair). Multiple G1 pixels arrayed in the image sensor 102 are collectively referred to as "a G1 pixel group", and multiple G2 pixels arrayed in the image sensor 102 are collectively referred to as "a G2 pixel group".

Figure 7:
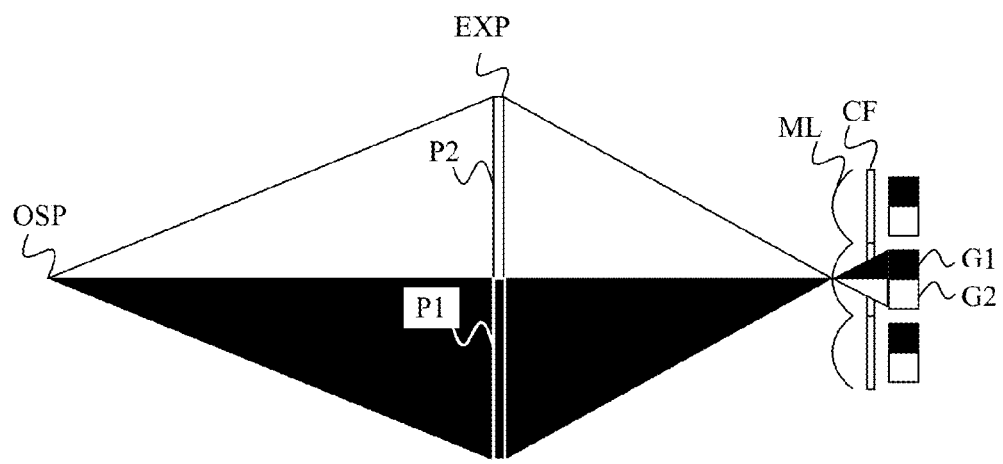
FIG. 7 schematically illustrates an image acquirer.

FIG. 7 schematically illustrates the image capturing unit when it is assumed that a thin lens is provided in place of the micro lens ML illustrated in FIG. 6 at a position of the exit pupil EXP. The G1 pixel receives a light flux passing through a P1 area of the exit pupil EXP, and the G2 pixel receives a light flux passing through a P2 area of the exit pupil EXP. OSP represents an object point to be captured. An object does not necessarily need to be at the object point OSP. Aa light flux passing through this object point OSP enters the G1 pixel or the G2 pixel depending on an area (position) of the exit pupil EXP through which the light flux passes. Passing of the light fluxes through such mutually different areas of the exit pupil EXP corresponds to separation of an incident light from the object point OSP depending on its angle (parallax). In other words, of the G1 and G2 pixels provided for each micro lens ML, an image produced by using an output signal from the G1 pixel and an image produced by using an output signal from the G2 pixel are multiple (in this example, pair of) parallax images having a parallax therebetween. Reception of the light fluxes passing through the mutually different areas of the exit pupil by the mutually different light-receiving portions (pixels) is hereinafter referred to as "pupil division".

Even when the conjugate relation described above becomes incomplete due to, for example, a shift of the position of the exit pupil EXP or when the P1 and P2 areas partially overlap each other in FIGS. 6 and 7, obtained multiple images can be treated as parallax images.

Figure 8:
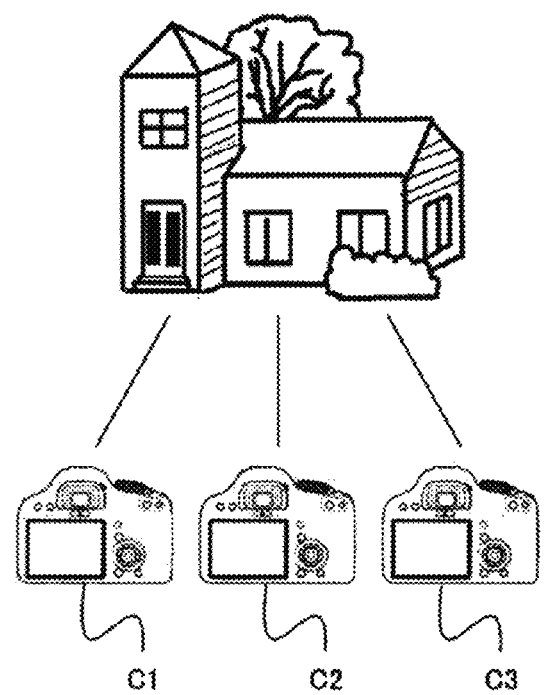
FIG. 8 illustrates an exemplary image capturing of Embodiment 3.

As another example, parallax images are also obtained by image capturing of an identical object by using multiple cameras as illustrated in FIG. 8. Although C1, C2 and C3 denote separate cameras in reality, these cameras can be regarded as an integrated image capturing apparatus that performs image capturing through three areas obtained by dividing a large pupil.

Figure 9:
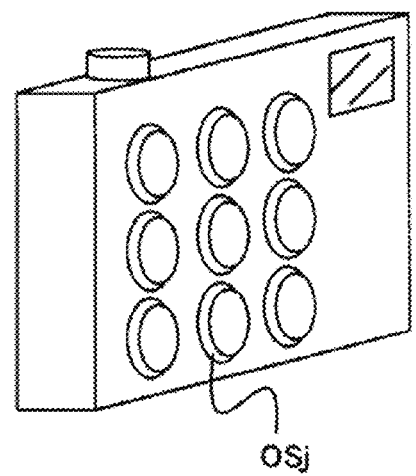
FIG. 9 illustrates an exemplary image capturing of Embodiment 3.

Alternatively, the pupil division may be performed by providing multiple image-capturing optical systems OSj (j=1, 2, 3, . . . ) to one image capturing apparatus as illustrated in FIG. 9.

Embodiment 4

Figure 10:
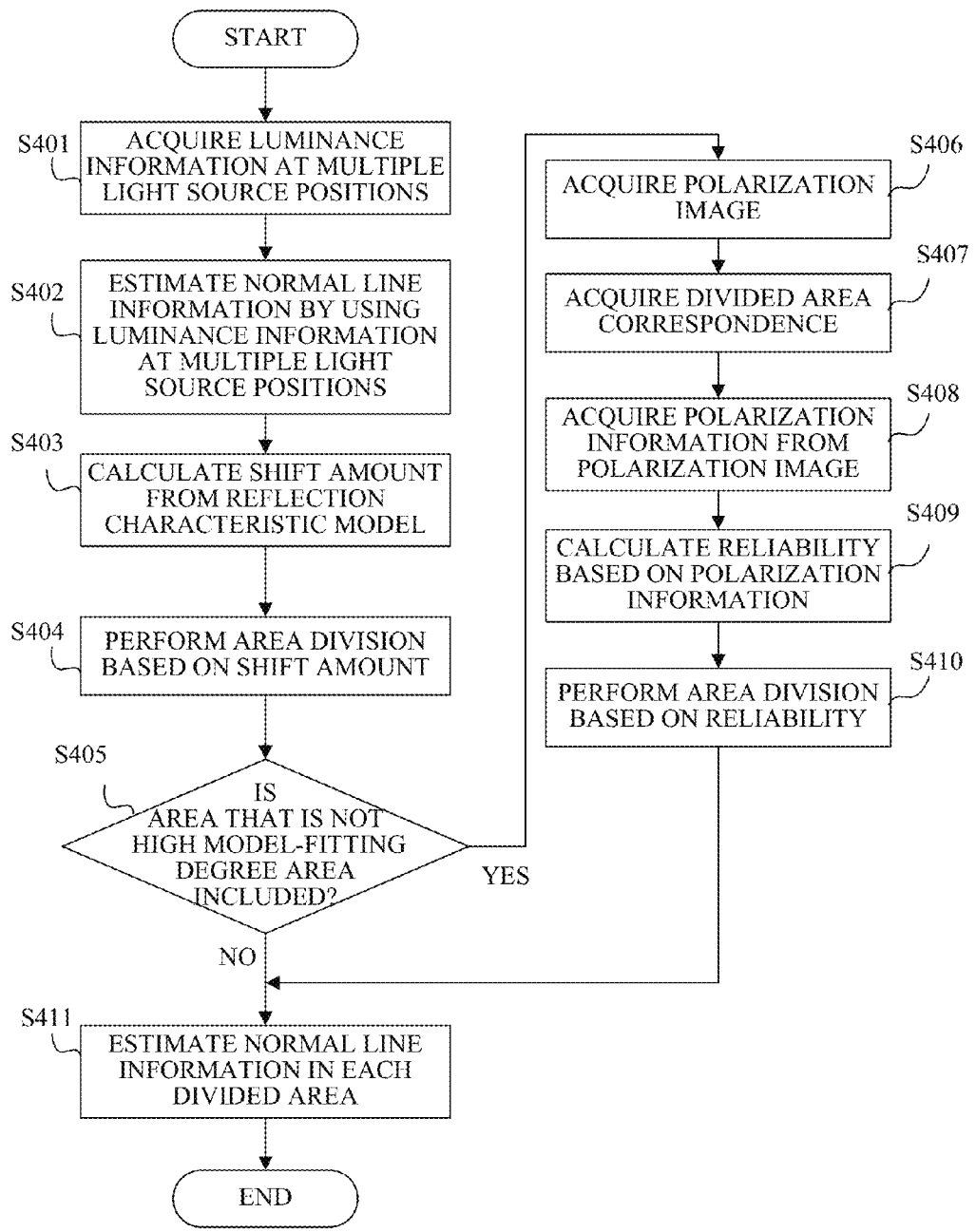
FIG. 10 is a flowchart illustrating an image process performed by an image capturing apparatus that is Embodiment 4 of the present invention.

Next, description will be made of an estimation process of the surface normal information by an image capturing apparatus that is Embodiment 4 of the present invention with reference to FIG. 10. This embodiment is different from Embodiment 1 in that, after the area division is performed on the basis of the luminance information corresponding to the light source positions, a process on the polarization images is performed. The image capturing apparatus of this embodiment has the same basic configuration as that of the image capturing apparatus of Embodiment 1.

Steps S401 to S404, and S406 are the same as steps S101 to S105 in Embodiment 1 (FIG. 1). Step S411 is the same as step S110. At step S407, similarly to step S109, when image capturing apparatuses and image-capturing conditions used to acquire the luminance information and polarization images are different from each other, the image processor 104 acquires the correspondences between the divided areas obtained by the area division based on the model error amount and the divided areas obtained by the area division based on the reliability.

At step S405, the image processor 104 determines whether or not the divided areas obtained by the area division at step S404 include any area that is not the high model-fitting degree area. The image processor 104 proceeds to step S406 if the divided areas include the area that is not the high model-fitting degree area or proceeds to step S411 if not.

At steps S408 to S410, the image processor 104 performs the same processes as those at steps S106 to S108. However, the image processor 104 performs these processes only on a divided area determined to be the area that is not the high model-fitting degree area at step S404.

In this embodiment, since the process relating to the polarization information is not performed on the high model-fitting degree area, a faster processing than that of Embodiment 1 can be performed. In particular, a faster processing can be resulted from a smaller number of the divided areas in which it is difficult to perform the estimation of the surface normal information from the change of the luminance information corresponding to the light source positions as described above.

Embodiment 5

Figure 11:
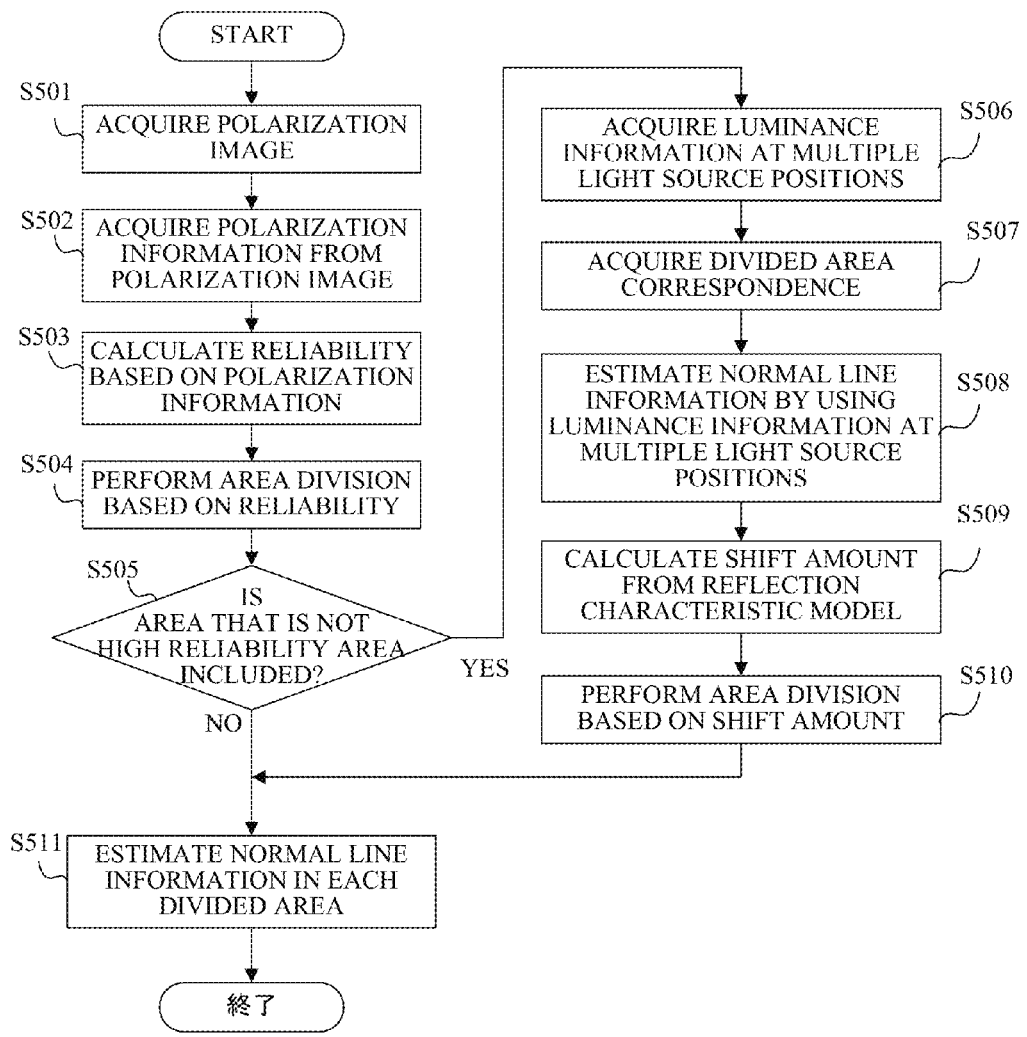
FIG. 11 is a flowchart illustrating an image process performed by an image capturing apparatus that is Embodiment 5 of the present invention.

Next, description will be made of an estimation process of the surface normal information by an image capturing apparatus that is Embodiment 5 of the present invention with reference to FIG. 11. This embodiment is different from Embodiment 1 in that a process relating to the luminance information depending on the light source positions is performed after the area division based on the polarization information. The image capturing apparatus of this embodiment has the same basic configuration as that of the image capturing apparatus of Embodiment 1.

Steps S501 to S504 and S506 are the same as steps S105 to S108 and S101 in Embodiment 1 (FIG. 1). Step S511 is the same as step S110. At step S507, similarly to step S109, when image capturing apparatuses and image-capturing conditions used acquire the luminance information and polarization images are different from each other, the image processor 104 acquires the correspondences between the divided areas obtained by the area division based on the model error amount and the divided areas obtained by the area division based on the reliability.

At step S505, the image processor 104 determines whether or not the divided areas obtained by the area division at step S504 include any area that is not the high reliability area. The image processor 104 proceeds to step S506 if the divided areas include the area that is not the high reliability area or proceeds to step S511 if not.

At steps S508 to S510, the image processor 104 performs the same processes as those at steps S102 to S104. However, the image processor 104 performs these processes only on the divided area determined to be the area that is not the high reliability area at step S501.

In this embodiment, since the process relating to the luminance information depending on the light source positions is not performed on the high reliability area, a faster processing than that of Embodiment 1 can be performed. In particular, a faster processing can be resulted from a smaller number divided areas in which it is difficult to perform the estimation of the surface normal information from the polarization information as described above.

The acquisition of the luminance information at step S506 may be performed at step S501 simultaneously.

Embodiment 6

Although Embodiments 1 to 5 each describe the image capturing apparatus with which the image processor 104 is equipped, the estimation of the surface normal information (the surface normal information producing method) described in Embodiments 1 to 5 can be performed by a surface normal information producing program installed on a personal computer. In this case, the personal computer corresponds to the surface normal information producing apparatus.

Figure 18:
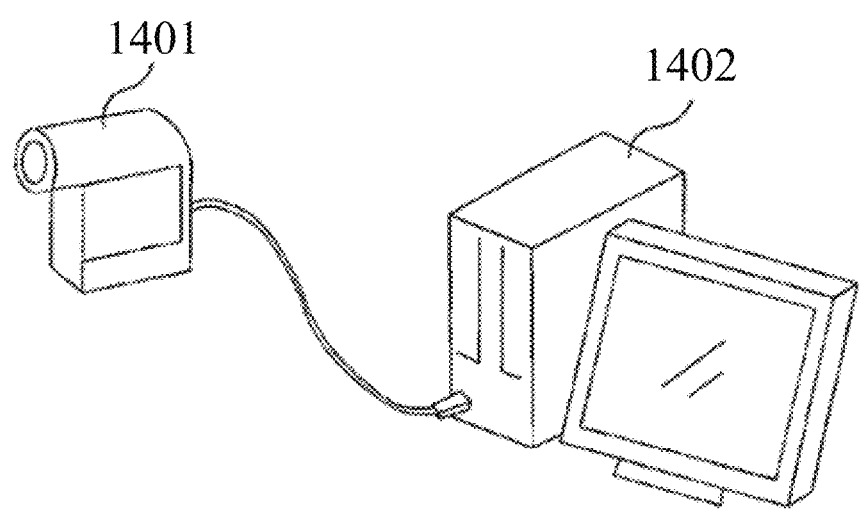
FIG. 18 illustrates a surface normal information producing apparatus that is Embodiment 6 of the present invention.

As illustrated in FIG. 18, a personal computer 1402 takes in images (luminance information images, polarization images, and object images) produced by image capturing through the image capturing apparatus 1401 via cable communication, wireless communication or a recording medium such as semiconductor memory or an optical disk. Then, the personal computer 1402 performs the estimation of the surface normal information, similarly to Embodiments 1 to 5, according to the surface normal information producing program and outputs a result of the estimation.

Each of the embodiments selects the information relating to the change of the luminance information corresponding to the light source positions or the polarization information, as information to be used to produce the surface normal information for each divided area obtained by the area division of the surface of the object, thereby producing of robust surface normal information for common objects.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-008230, filed on Jan. 20, 2015, which is hereby incorporated by reference wherein in its entirety.

What is claimed is:

1. A surface normal information producing apparatus configured to produce surface normal information on a normal line to a surface of an object by using a captured image acquired by image capturing of the object, the apparatus comprising:
    an image acquirer configured to acquire, as the captured images, (a) multiple first images in which light source positions relative to the object are mutually different and (b) three or more second images in which polarization states are mutually different;
    a divider configured to perform area division of the surface of the object depending on at least one of luminance information that changes corresponding to the light source positions acquired from the first images and polarization information acquired from the second images; and
    a producer configured to select, for each divided area obtained by the area division, information to be used in production of the surface normal information from (c) information relating to change of the luminance information corresponding to the light source positions and (d) the polarization information to perform the production of the surface normal information.

2. A surface normal information producing apparatus according to claim 1, wherein:
    the producer is configured to use a reflection characteristic model when producing the surface normal information by using the information relating to the change of the luminance information corresponding to the light source positions;
    the apparatus further includes a model error acquirer configured to acquire a model error amount between the luminance information and the reflection characteristic model; and
    the divider is configured to perform the area division based on the model error amount.

3. A surface normal information producing apparatus according to claim 2, wherein the model error acquirer is configured to acquire the model error amount by using a comparison result between the luminance information and a luminance value calculated using the reflection characteristic model.

4. A surface normal information producing apparatus according to claim 2, wherein the model error acquirer is configured to acquire the model error amount by using the luminance information and a parameter of a model applied to the reflection characteristic model.

5. A surface normal information producing apparatus according to claim 2, wherein the model error acquirer is configured to calculate the model error amount by using a variation of multiple candidates for the normal line to the surface calculated from the luminance information.

6. A surface normal information producing apparatus according to claim 2, wherein the reflection characteristic model is Lambert's model.

7. A surface normal information producing apparatus according to claim 2, wherein the producer is configured to produce the surface normal information by using the reflection characteristic model for, among the divided areas, at least one divided area in which the model error amount is smaller than a first model error amount.

8. A surface normal information producing apparatus according to claim 2, wherein the producer is configured to produce the surface normal information by using the polarization information for, among the divided areas, at least one divided area in which the model error amount is larger than a second model error amount.

9. A surface normal information producing apparatus according to claim 1, further comprising a reliability acquirer configured to acquire, when the surface normal information is produced by using the polarization information, a reliability of the production of the surface normal information by using the polarization information,
wherein the divider is configured to perform the area division based on the reliability.

10. A surface normal information producing apparatus according to claim 9, wherein the reliability acquirer is configured to acquire the reliability by using information on a polarization degree, which is included in the polarization information.

11. A surface normal information producing apparatus according to claim 9, wherein the reliability acquirer is configured to acquire the reliability by using a difference between a maximum value and a minimum value of a luminance of a polarized light, the values being included in the polarization information.

12. A surface normal information producing apparatus according to claim 9, wherein the reliability acquirer is configured to acquire the reliability by using information on a polarization direction, which is included in the polarization information.

13. A surface normal information producing apparatus according to claim 9, wherein the producer is configured to produce the surface normal information by using the polarization information for, among the divided areas, at least one divided area in which the reliability is higher than a first reliability.

14. A surface normal information producing apparatus according to claim 9, wherein the producer is configured to produce the surface normal information by using the information relating to the change of the luminance information corresponding to the light source positions for, among the divided areas, at least one divided area in which the reliability is lower than a second reliability.

15. An image capturing apparatus comprising:
an image capturer configured to acquire a captured image by image capturing of an object; and
a surface normal information producing apparatus configured to produce surface normal information on a normal line to a surface of the object using the captured image,
wherein the surface normal information producing apparatus comprising:
an image acquirer configured to acquire, as the captured images, (a) multiple first images in which light source positions relative to the object are mutually different and (b) three or more second images in which polarization states are mutually different;
a divider configured to perform area division of the surface of the object depending on at least one of luminance information that changes corresponding to the light source positions acquired from the first images and polarization information acquired from the second images; and
a producer configured to select, for each divided area obtained by the area division, information to be used in production of the surface normal information from (c) information relating to change of the luminance information corresponding to the light source positions and (d) the polarization information to perform the production of the surface normal information.

16. An image capturing apparatus according to claim 15, further comprising:
a light projector configured to illuminate the object; and
a mechanism capable of setting multiple light-projection positions of the light projector.

17. An image capturing apparatus according to claim 15, wherein the image capturer is configured to acquire, as the captured images, parallax images having a parallax therebetween.

18. An image capturing apparatus according to claim 17, wherein the apparatus is configured to acquire, as the parallax images, the multiple first images at least one viewpoint and the three or more second images at each of at least two viewpoints.

19. An image capturing apparatus according to claim 15, wherein:
the image capturer includes an image-capturing optical system and an image sensor; and
multiple light fluxes passing through mutually different areas of a pupil of the image-capturing optical system are guided to mutually different pixels of the image sensor.

20. An image capturing apparatus according to claim 15, wherein:
the image capturer includes an image-capturing optical system and an image sensor; and
the image sensor includes (a) multiple pixel pairs configured to respectively photoelectrically convert light fluxes from mutually different areas of a pupil of the image-capturing optical system and (b) micro lenses each provided for each pixel pair.

21. A surface normal information producing method to produce surface normal information on a normal line to a surface of an object by using a captured image obtained by image capturing of the object, the method comprising:
acquiring, as the captured images, (a) multiple first images in which light source positions relative to the object are mutually different and (b) three or more second images in which polarization states are mutually different;
performing area division of the surface of the object depending on at least one of luminance information that changes corresponding to the light source positions acquired from the first images and polarization information acquired from the second images; and
selecting, for each divided area obtained by the area division, information to be used in production of the surface normal information from (c) information relating to change of the luminance information corresponding to the light source positions and (d) the polarization information to perform the production of the surface normal information.

22. A non-transitory computer-readable storage medium storing a computer program configured to cause a computer to perform an image process to produce surface normal information on a normal line to a surface of an object by using a captured image obtained by image capturing of the object, the image process comprising:

acquiring, as the captured images, (a) multiple first images in which light source positions relative to the object are mutually different and (b) three or more second images in which polarization states are mutually different;

performing area division of the surface of the object depending on at least one of luminance information that changes corresponding to the light source positions acquired from the first images and polarization information acquired from the second images; and selecting, for each divided area obtained by the area division, information to be used in production of the surface normal information from (c) information relating to change of the luminance information corresponding to the light source positions and (d) the polarization information to perform the production of the surface normal information.

* * * * *